(12) United States Patent
Eom

(10) Patent No.: US 12,425,715 B2
(45) Date of Patent: Sep. 23, 2025

(54) ELECTRONIC APPARATUS AND CONTROLLING METHOD THEREOF

(71) Applicant: SAMSUNG ELECTRONICS CO., LTD., Suwon-si (KR)

(72) Inventor: Chungyong Eom, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 121 days.

(21) Appl. No.: 18/526,609

(22) Filed: Dec. 1, 2023

(65) Prior Publication Data

US 2024/0163546 A1 May 16, 2024

Related U.S. Application Data

(63) Continuation of application No. PCT/KR2023/011858, filed on Aug. 10, 2023.

(30) Foreign Application Priority Data

Nov. 16, 2022 (KR) ........................ 10-2022-0153991

(51) Int. Cl.
*H04N 23/62* (2023.01)
*H04N 23/63* (2023.01)
*H04N 23/661* (2023.01)

(52) U.S. Cl.
CPC ........... *H04N 23/62* (2023.01); *H04N 23/631* (2023.01); *H04N 23/661* (2023.01)

(58) Field of Classification Search
CPC ..... H04N 23/62; H04N 23/661; H04N 23/631

(Continued)

(56) References Cited

U.S. PATENT DOCUMENTS

| 9,363,417 B2 | 6/2016 | Arai |
| 10,555,260 B2 | 2/2020 | Nakajima |
| 11,071,153 B2 | 7/2021 | Lee et al. |
| 11,334,659 B2 | 5/2022 | Jeon |
| 11,589,222 B2 | 2/2023 | Hwang et al. |

(Continued)

FOREIGN PATENT DOCUMENTS

| EP | 3 737 102 A1 | 11/2020 |
| JP | 2015-84514 A | 4/2015 |

(Continued)

OTHER PUBLICATIONS

Pooyan Shams Farahsari et al., "A Survey on Indoor Positioning Systems for IoT-Based Applications", IEEE Internet of Things Journal, vol. 9, No. 10, May 15, 2022, pp. 7680-7699, DOI: 10.1109/JIOT.2022.3149048.

(Continued)

*Primary Examiner* — Joel W Fosselman
(74) *Attorney, Agent, or Firm* — Sughrue Mion, PLLC

(57) ABSTRACT

An electronic apparatus includes a camera; a communication interface configured to communicate with an external device; and at least one processor configured to: receive, through the communication interface from the external device, first order information including an order of operations performed by the external device, based on receiving the first order information, obtain a plurality of captured images including the external device through the camera, obtain second order information indicating an order of operations performed by the external device based on the plurality of captured images, and based on the first order information matching the second order information, authenticate the external device.

20 Claims, 23 Drawing Sheets

(58) Field of Classification Search
USPC .................................................. 348/333.01
See application file for complete search history.

(56) References Cited

U.S. PATENT DOCUMENTS

| | | | |
|---|---|---|---|
| 11,690,113 | B2 | 6/2023 | Eom et al. |
| 11,785,167 | B2 * | 10/2023 | Tanaka ................... H04N 1/442 358/1.14 |
| 2006/0284969 | A1 | 12/2006 | Kim et al. |
| 2015/0077799 | A1 | 3/2015 | Arai |
| 2016/0330623 | A1 | 11/2016 | Koriyama et al. |
| 2016/0373437 | A1 | 12/2016 | He et al. |
| 2018/0063710 | A1 | 3/2018 | Chen et al. |
| 2020/0026845 | A1 | 1/2020 | Jeon |
| 2020/0359217 | A1 | 11/2020 | Hwang et al. |
| 2023/0171010 | A1 | 6/2023 | Pedan et al. |

FOREIGN PATENT DOCUMENTS

| | | | |
|---|---|---|---|
| JP | 2016-162359 | A | 9/2016 |
| JP | 6482311 | B2 | 3/2019 |
| JP | 2022-152113 | A | 10/2022 |
| KR | 10-2006-0133427 | A | 12/2006 |
| KR | 10-2011-0106547 | A | 9/2011 |
| KR | 10-1519639 | B1 | 5/2015 |
| KR | 10-2015-0117885 | A | 10/2015 |
| KR | 10-2018-0083787 | A | 7/2018 |
| KR | 10-2019-0105534 | A | 9/2019 |
| KR | 10-2020-0129297 | A | 11/2020 |
| KR | 10-2021-0152850 | A | 12/2021 |

OTHER PUBLICATIONS

International Search Report (PCT/ISA/210) issued Nov. 29, 2023 by the International Searching Authority in International Application No. PCT/KR2023/011858.
Written Opinion (PCT/ISA/237) issued Nov. 29, 2023 by the International Searching Authority in International Application No. PCT/KR2023/011858.
Communication dated Jul. 21, 2025, issued by European Patent Office in European Patent Application No. 23891766.0.

* cited by examiner

FIG. 20
| CATEGORY | REFRIGERATOR | AIR-CONDITIONER | WASHING MACHINE |
|---|---|---|---|
| START OPERATION | REF ACTION #S | AC ACTION #S | WM ACTION #S |
| END OPERATION | REF ACTION #E | AC ACTION #E | WM ACTION #E |
| A OPERATION | REF ACTION #A | AC ACTION #A | WM ACTION #A |
| B OPERATION | REF ACTION #B | AC ACTION #B | WM ACTION #B |
| C OPERATION | REF ACTION #C | AC ACTION #C | WM ACTION #C |
| D OPERATION | REF ACTION #D | AC ACTION #D | WM ACTION #D |
| ... | ... | ... | ... |
2010
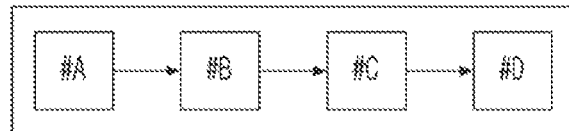
2020
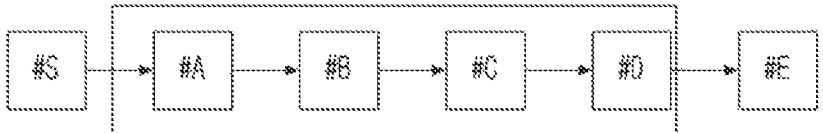
2030

1

ELECTRONIC APPARATUS AND CONTROLLING METHOD THEREOF

CROSS-REFERENCE TO RELATED APPLICATIONS

This application is a by-pass continuation of International Application No. PCT/KR2023/011858, filed on Aug. 10, 2023, which is based on and claims priority to Korean Patent Application No. 10-2022-0153991, filed on Nov. 16, 2022, in the Korean Intellectual Property Office, the disclosures of which are incorporated by reference herein in their entireties.

BACKGROUND

1. Field

The disclosure relates to an electronic apparatus and a controlling method thereof and, more particularly to an electronic apparatus authenticating an external device performing communication connection and a controlling method thereof.

2. Description of Related Art

In order to control a household device in a specific space, a user may directly control the household device or use an exclusive remote control device for the household device. However, the household device may be controlled by using a user terminal device different from the exclusive remote control device.

When the household device is to be controlled through a user terminal device, a communication connection operation between the external device and the user terminal device may be necessary. When the user terminal device is to be connected to an external device, the user terminal device may determine whether the external device is an authenticated device. That is, the user terminal device may perform a procedure for authenticating an external device.

For example, as the authentication operation, an operation to cause a user to directly press a specific button of a household device, an operation to cause a user to recognize a quick response (QR) code attached to the household device may be performed.

However, in a situation where a user cannot directly access a household device, the user terminal device cannot perform an authentication operation. For example, in the case of a system air conditioner arranged on a ceiling, a user may need to climb on a chair or use a ladder to press a specific button or capture a QR code of the system air conditioner and may feel inconvenience.

SUMMARY

Provided are an electronic apparatus to authenticate an external device by comparing an order of operations performed by an external device and an order of operations obtained by a captured image, and a control method thereof.

According to an aspect of the disclosure, an electronic apparatus includes: a camera; a communication interface configured to communicate with an external device; and at least one processor configured to: receive, through the communication interface from the external device, first order information including an order of operations performed by the external device, based on receiving the first order information, obtain a plurality of captured images including the external device through the camera, obtain second order information indicating an order of operations performed by the external device based on the plurality of captured images, and based on the first order information matching the second order information, authenticate the external device.

The at least one processor may be further configured to, based on identifying an event related to connection with the external device, transmit an event notification to the external device through the communication interface, the first order information may be generated in the external device based on the reception of the event notification, and the event related to connection with the external device may include reception of a beacon signal broadcasted from the external device.

The first order information may further include information related to an order in which a plurality of randomly selected operations are performed by the external device.

The first order information may further include a preset start operation, a plurality of the randomly selected operations, and a preset end operation.

The at least one processor may be further configured to: based on the first order information matching the second order information, transmit an authentication success notification to the external device through the communication interface, and control the communication interface to communicably connect to the external device.

The plurality of captured images may be first captured images, and the at least one processor may be further configured to: based on the first order information and the second order information not matching, identify a first operation among the first order information that does not match the second order information, transmit, through the communication interface, a control command to cause the external device to perform the first operation, based on the control command being transmitted to the external device, obtain a second captured image including the external device through the camera, and based on identifying that the external device performs the first operation based on the second captured image, authenticate the external device.

The plurality of captured images are first captured images, and the at least one processor may be further configured to: based on the first order information and the second order information not matching, obtain a second captured image including the external device through the camera, obtain third order information indicating an order of operations performed by the external device based on the second captured image, obtain fourth order information by combining the second order information and the third order information, and based on the first order information and the fourth order information matching, authenticate the external device.

The electronic apparatus may further include a display, and the at least one processor may be further configured to, based on receiving the first order information through the communication interface, control the display to display a screen configured to allow a user to cause the camera to capture the plurality of captured images.

The electronic apparatus may further include a display, and the at least one processor may be further configured to, based on the first order information and the second order information not matching, control the display to display a screen regarding re-capture a plurality of images of the external device.

The first order information may further include time information related to the performance of a plurality of operations included in the first order information, and the at least one processor may be further configured to identify whether the camera is activated based on the time information.

According to an aspect of the disclosure, a method of controlling an electronic apparatus configured to communicate with an external device, includes: receiving, from the external device, first order information including an order of operations performed by the external device; based on receiving the first order information, obtaining a plurality of captured images including the external device; obtaining second order information indicating an order of operations performed by the external device based on the plurality of captured images; and based on the first order information matching the second order information, authenticating the external device.

The method may further include: based on identifying an event related to connection with the external device, transmitting an event notification to the external device, the first order information may be generated in the external device based on the reception of the event notification, and the event related to connection with the external device may include reception of a beacon signal broadcasted from the external device.

The first order information may further include information related to an order in which a plurality of randomly selected operations are performed by the external device.

The first order information may further include a preset start operation, a plurality of the randomly selected operations, and a preset end operation.

The method may further include: based on the first order information matching the second order information, transmitting an authentication success notification to the external device; and connecting to the external device.

The method may further include: based on the first order information and the second order information not matching, identifying a first operation among the first order information that does not match the second order information; transmitting a control command to cause the external device to perform the first operation; based on the control command being transmitted to the external device, obtaining one or more second captured images including the external device; and based on identifying that the external device performs the first operation based on the one or more second captured images, authenticating the external device.

The method may further include: based on the first order information and the second order information not matching, obtaining a second captured image including the external device, obtaining third order information indicating an order of operations performed by the external device based on the second captured image, obtaining fourth order information by combining the second order information and the third order information, and based on the first order information and the fourth order information matching, authenticating the external device.

According to an aspect of the disclosure, a non-transitory computer readable medium has instructions stored therein, which when executed by at least one processor cause the at least one processor to execute a method of controlling an electronic apparatus, the method including: receiving, from an external device, first order information including an order of operations performed by the external device; based on receiving the first order information, obtaining a plurality of captured images including the external device; obtaining second order information indicating an order of operations performed by the external device based on the plurality of captured images; and based on the first order information matching the second order information, authenticating the external device.

The method may further include, based on identifying an event related to connection with the external device, transmitting an event notification to the external device, the first order information may further include information generated in the external device based on the reception of the event notification, and the event related to connection with the external device may include reception of a beacon signal broadcasted from the external device.

The method may further include: based on the first order information and the second order information not matching, obtaining a second captured image including the external device; obtaining third order information indicating an order of operations performed by the external device based on the second captured image; obtaining fourth order information by combining the second order information and the third order information, and based on the first order information and the fourth order information matching, authenticating the external device.

BRIEF DESCRIPTION OF DRAWINGS

The above and other aspects, features, and advantages of certain embodiments of the present disclosure will be more apparent from the following description taken in conjunction with the accompanying drawings, in which:

FIG. 20 is a diagram illustrating a structure of order information according to one or more embodiments of the disclosure;

DETAILED DESCRIPTION

Embodiments of the disclosure will be described below in greater detail with reference to the attached drawings.

The terms used in the disclosure and the claims are general terms identified in consideration of the functions of embodiments of the disclosure. However, these terms may vary depending on intention, legal or technical interpretation, emergence of new technologies, and the like of those skilled in the related art. In addition, in some cases, a term may be selected by the applicant, in which case the term will be described in detail in the description of the corresponding disclosure. Thus, the term used in this disclosure should be defined based on the meaning of term, not a simple name of the term, and the contents throughout this disclosure.

Expressions such as "have," "may have," "include," "may include" or the like represent presence of corresponding numbers, functions, operations, or parts, and do not exclude the presence of additional features.

Expressions such as "at least one of A or B" and "at least one of A and B" should be understood to represent "A," "B" or "A and B."

As used herein, terms such as "first," and "second," may identify corresponding components, regardless of order and/or importance, and are used to distinguish a component from another without limiting the components.

In addition, a description that one element (e.g., a first element) is operatively or communicatively coupled with/to" or "connected to" another element (e.g., a second element) should be interpreted to include both the first element being directly coupled to the second element, and the first element being indirectly coupled to the second element through a third element.

A singular expression includes a plural expression, unless otherwise specified. It is to be understood that terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

A term such as "module," "unit," and "part," is used to refer to an element that performs at least one function or operation and that may be implemented as hardware or software, or a combination of hardware and software. Except when each of a plurality of "modules," "units," "parts," and the like must be realized in an individual hardware, the components may be integrated in at least one module or chip and be realized in at least one processor.

In the following description, a "user" may refer to a person using an electronic apparatus or an artificial intelligence electronic apparatus using an electronic apparatus (e.g., artificial intelligence electronic apparatus).

Figure 1:
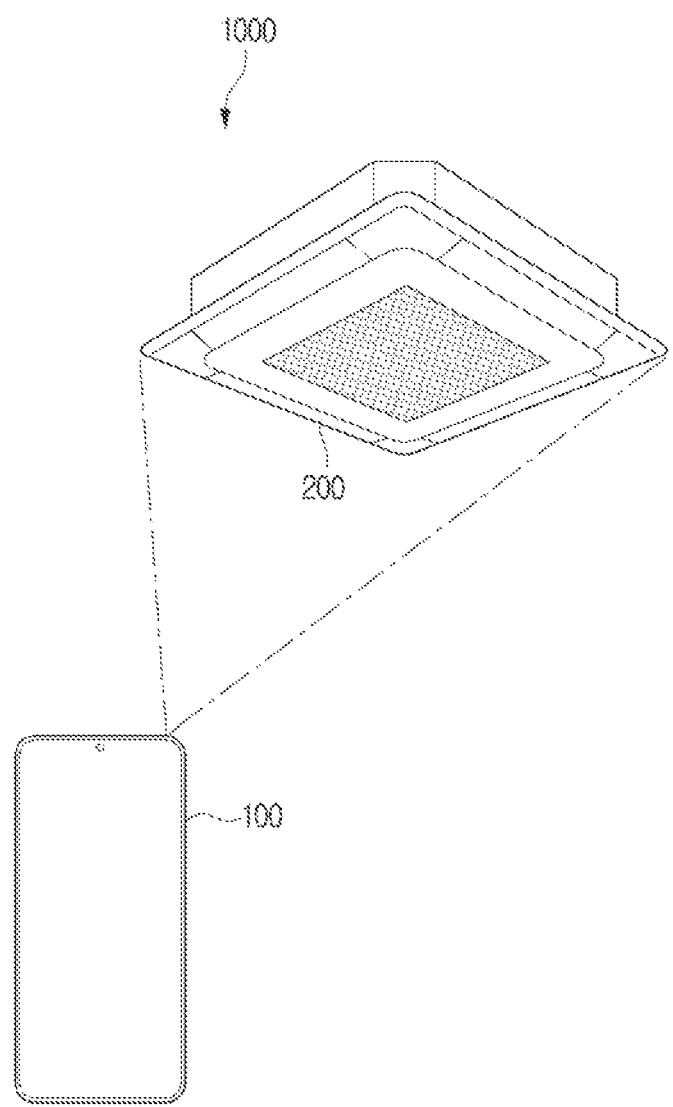
FIG. 1 is a diagram illustrating a system including an electronic apparatus and an external device.

FIG. 1 is a diagram illustrating a system 1000 including an electronic apparatus 100 and an external device 200.

Referring to FIG. 1, the system 1000 may include the electronic apparatus 100 and the external device 200.

The system 1000 may be a system in which different devices are connected by a wireless communication method in a specific space. The system 1000 may mean internet of things (IoT).

The electronic apparatus 100 may be a user terminal device. In addition, the electronic apparatus 100 may be a device for controlling the external device 200 or a device for receiving information on the external device 200. For example, the electronic apparatus 100 may be a mobile device.

The external device 200 may be a household device. In addition, the external device 200 may refer to a device disposed in a specific space. For example, the external device 200 may refer to an air conditioner, an air purifier, a refrigerator, a washing machine, a dryer, a dishwasher, an artificial intelligence (AI) speaker, an AI lighting device, and the like.

Figure 2:
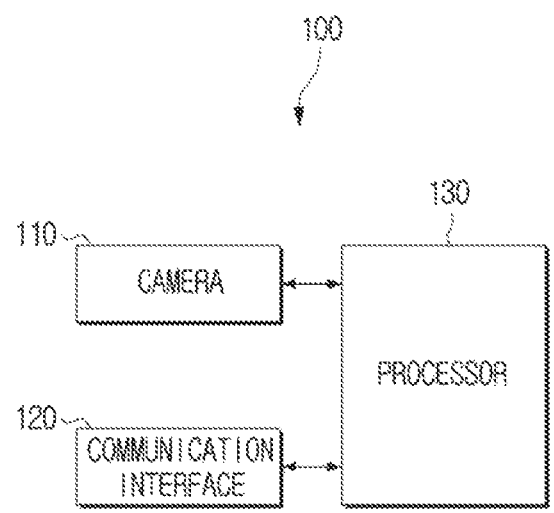
FIG. 2 is a block diagram illustrating an electronic apparatus according to one or more embodiments of the disclosure.

FIG. 2 is a block diagram illustrating an electronic apparatus 100 according to one or more embodiments of the disclosure.

Referring to FIG. 2, the electronic apparatus 100 may include at least one of the camera 110, a communication interface 120 or at least one processor 130.

The electronic apparatus 100 may be a device including a camera 110. The electronic apparatus 100 may capture an image of the external device 200 by using the camera 110. The electronic apparatus 100 may be a user terminal device including the camera 110. For example, the electronic apparatus 100 may be a smartphone or a tablet.

The camera 110 may be an image sensor for obtaining image data.

The communication interface 120 may communicate with the external device 200.

At least one processor 130 may receive, from the external device 200, first order information including an order of operations performed by the external device 200 through the communication interface 120, based on receiving the first order information, obtain a plurality of captured images including the external device 200 through the camera 110, obtain second order information indicating an order of operations performed by the external device 200 based on the plurality of captured images, and based on the first order information matching the second order information, authenticate the external device 200.

The at least one processor 130 may, based on an event related to connection with the external device 200 being identified, transmit an event notification to the external device 200 through the communication interface 120.

The event related to connection with the external device 200 may be an event for receiving a beacon signal broadcasted from the external device 200.

Also, an event related to connection with the external device 200 may mean an authentication event of the external device 200. An authentication event of the external device 200 may mean an event requiring authentication for the external device 200.

An authentication event of the external device 200 may include at least one of an event related to network connection, an event in which a user input for connecting to another device is received, an event in which a user input for connecting to the external device 200 is received, an event in which a communication signal is received from an external device, or an event in which a communication connection request is received from an external device.

The event related to network connection may include at least one event in which network connection is newly made, an event in which network reconnection is required, and an event in which network connection information is changed.

Also, an event related to connection with the external device 200 may refer to an event for checking whether the external device 200 is in proximity to the external device 200. The at least one processor 130 may first determine whether there is a proximity before connection with the external device 200. Therefore, the at least one processor 130 may determine whether the external device 200 is present within a threshold distance from the electronic apparatus 100. The at least one processor 130 may determine whether the external device 200 is within a threshold distance from the electronic apparatus 100 through the captured image. Specifically, the at least one processor 130 may analyze the captured image to determine whether the external device 200 is in proximity by using the order of operations (or functions) performed by the external device 200.

The at least one processor 130 may receive the first order information from the external device 200.

The first order information may be information generated by the external device 200 based on the receiving of an event notification. The external device 200 may receive an event notification from the electronic apparatus 100.

The first order information may include information related to an order in which a plurality of randomly selected operations are performed among a plurality of operations performed by the external device 200.

According to one or more embodiments, the first order information may include a plurality of operations.

According to one or more embodiments, the first order information may include only one operation. The order information may not necessarily include a plurality of operations. In order to avoid confusion that the expression of the order necessarily includes a plurality of operations, the order information may be described as operational information.

According to one or more embodiments, the first order information may further include a start operation and an end operation, in addition to one randomly generated operation. A description related thereto will be described in FIG. 20.

The order information may be described as operational order information to clarify that the target of the order information indicates an operation performed by the external device 200.

According to one or more embodiments, the number of operations included in the first order information may be a predetermined number.

According to one or more embodiments, the number of operations included in the first order information may be generated in a random manner.

For example, it is assumed that a total of 10 operations from A to J may be performed by the external device 200. In addition, it is assumed that the number of operations included in the first order information is four. The external device 200 may randomly select four (ABCD) operations among ten operations. The external device 200 may generate (or obtain) first order information indicating that A, B, C, and D operations are sequentially performed.

The first order information may include a preset start operation, a plurality of randomly selected operations, and a preset end operation.

The external device 200 may perform a plurality of operations included in the first order information based on the first order information.

The at least one processor 130 may, when the first order information and the second order information are the same, transmit an authentication success notification to the external device 200 through the communication interface 120 and may control the communication interface 120 for connection with the external device 200.

The at least one processor 130 may determine whether the order of operations included in the first order information and the order of operations included in the second order information are the same. When the order of operations included in the first order information and the order of operations included in the second order information are the same, the at least one processor 130 may determine that the authentication of the external device 200 is successful.

According to one or more embodiments, if authentication is successful, the at least one processor 130 may control the communication interface 120 for connection with the external device 200.

According to one or more embodiments, when authentication is successful, the at least one processor 130 may execute an application for performing a configuration related to connection with the external device 200. The application may be a setup application. The matching between the first order information and the second order information may be a condition for executing the setup application. The electronic apparatus 100 may be connected to the external device 200 or control the external device 200 through a setup application.

The comparison operation of the first order information and the second order information will be described in FIG. 4.

An operation of counting the comparison numbers of the first order information and the second order information will be described in FIGS. 5 and 6.

A criterion of determining whether the first order information and the second order information match will be described in FIG. 7.

If a plurality of captured images include a first captured image and the first order information and the second order information do not match, the at least one processor 130 may identify a first operation that does not match the second order information among the first order information, transmit a control command for performing the first operation to the external device 200 through the communication interface 120, obtain a second captured image including the external device 200 through the camera 110 when the control command is transmitted to the external device 200, and authenticate the external device 200 when it is identified that the external device 200 has performed the first operation based on the second captured image.

According to one or more embodiments, an operation that does not match a plurality of operations included in second order information among a plurality of operations included in the first order information may be one (first operation). The at least one processor 130 may generate a control command for performing one first operation, and may transmit the generated control command to the external device 200.

According to one or more embodiments, the number of operations not matching a plurality of operations included in the second order information may be in plural, among the plurality of operations included in the first order information. The at least one processor 130 may generate a control command to perform a plurality of operations or transmit the generated control command to the external device 200.

A specific description thereof will be described in FIG. 8. The operation not matching the second order information among operations included in the first order information may be recited as a unmatched operation. In addition, the information indicating the unmatched operation (first operation) may be recited as the third order information. The third order information may include the information about the unmatched operation (first operation) and a control command to perform the unmatched operation (first operation).

The plurality of captured images may be first captured images, and the at least one processor 130 may, based on the first order information and the second order information not matching, obtain a second captured image including the external device 200 through the camera, obtain third order information indicating an order of operations performed by the external device 200 based on the second captured image, obtain fourth order information by combining the second order information and the third order information, and based on the first order information and the fourth order information matching, authenticate the external device 200.

A specific description thereof will be described in FIGS. 9 and 10.

The electronic apparatus 100 may further include the display 140, and the at least one processor 130 may, based on receiving the first order information through the communication interface 120, control the display to display a screen to capture the external device 200.

Figure 12:
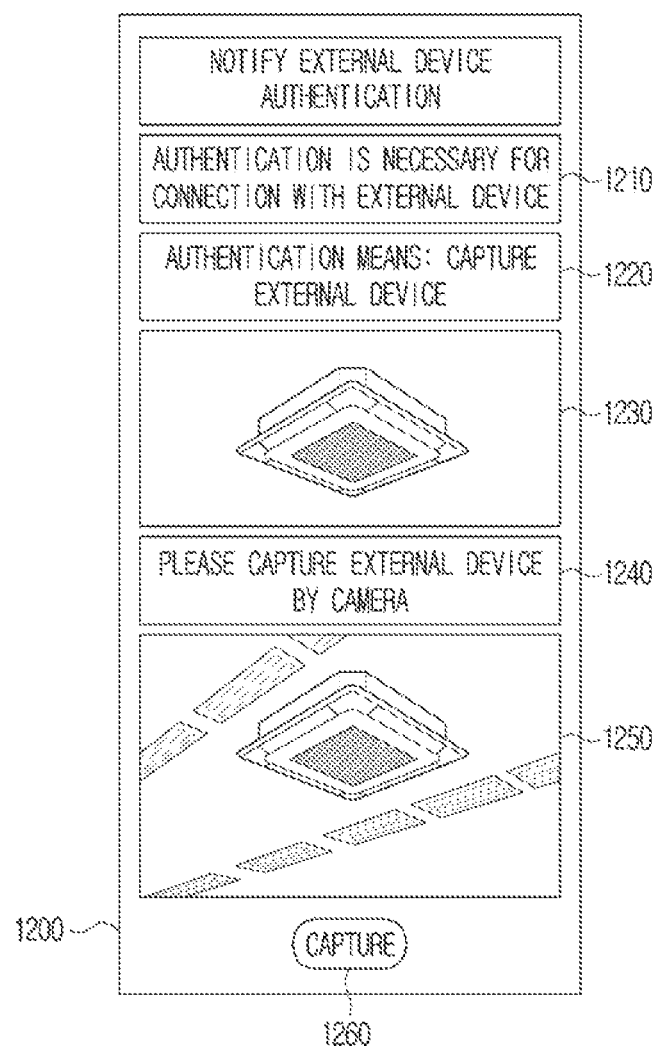
FIG. 12 is a diagram illustrating a UI displayed in an external device connection process according to one or more embodiments of the disclosure.

When the first order information is received from the external device 200, the at least one processor 130 may display a screen 1200 of FIG. 12. A specific description will be recited in FIG. 12.

The electronic apparatus 100 may further include a display, and the at least one processor 130 may, based on the first order information and the second order information not matching, control the display to display a screen to re-capture the external device 200.

A specific description related thereto will be described in FIGS. 13 and 14.

The first order information may include time information of performing a plurality of operations included in the first order information, and the at least one processor 130 may determine whether the camera 110 is activated based on the time information included in the first order information.

At least one processor 130 may determine a time point to activate a camera and a time point to deactivate a camera.

The external device 200 may generate first order information including orders of randomly-generated plurality of operations and information about time when a plurality of operations are performed.

At least one processor 130 may obtain time information based on first order information received from the external device 200. In addition, the at least one processor 130 may predict, based on the obtained time information, how long the external device 200 will perform operations. The at least one processor 130 may activate and deactivate the camera 110 based on the time information.

The electronic apparatus 100 according to one or more embodiments may directly capture the external device 200 to authenticate the external device 200. A user who wants to use the external device 200 may simply capture the external device 200 through the camera 110 of the electronic apparatus 100, and thus may easily authenticate the external device 200.

If the user misidentifies the external device 200 and captures another device, the first order information generated by the external device 200 is different from the second order information obtained through the captured image, and thus the authentication may not be successful. Accordingly, the electronic apparatus 100 may request the user to re-capture images by providing the user with information on the authentication failure.

Figure 3:
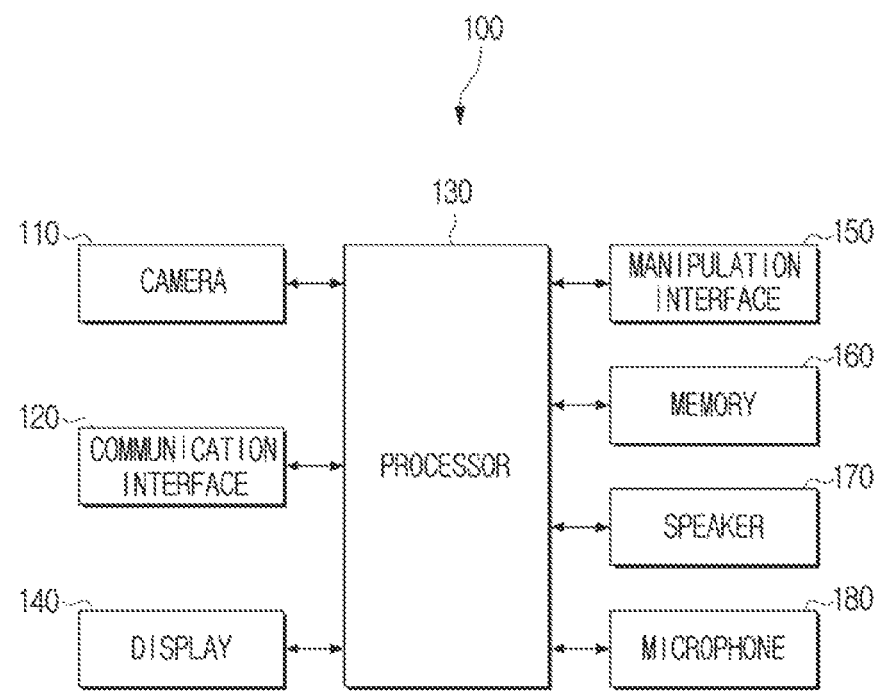
FIG. 3 is a block diagram illustrating a specific configuration of the electronic apparatus of FIG. 1.

FIG. 3 is a block diagram illustrating a specific configuration of the electronic apparatus 100 of FIG. 1.

Referring to FIG. 3, the electronic apparatus 100 may include at least one of the camera 110, the communication interface 120, at least one processor 130, display 140, manipulation interface 150, memory 160, speaker 170, or microphone 180.

The electronic apparatus 100 according to one or more embodiments may include at least one of a smartphone, a tablet PC, a mobile phone, a desktop PC, a laptop PC, a personal digital assistant (PDA), or a portable multimedia player (PMP). In one or more embodiments, the electronic apparatus 100 may include, for example, at least one of a television, a digital video disk (DVD) player, and a media box (e.g., Samsung HomeSync™, Apple TV™, or Google TV™).

The camera 110 is configured to generate a captured image by capturing a subject. The captured image may include both a moving image and a still image. The camera 110 may obtain an image of at least one external device and may be implemented as a camera, a lens, an infrared sensor, or the like.

The camera 110 may include a lens and an image sensor. The type of lens may be a general purpose lens, a wide angle lens, a zoom lens, or the like, and may be determined according to the type, characteristics, usage environment, or the like, of the electronic apparatus 100. A complementary metal oxide semiconductor (CMOS) and a charge coupled device (CCD), or the like, may be used as the image sensor.

The camera 110 may output the incident light as an image signal. For example, the camera 110 may include a lens, a pixel, and an analog-to-digital (AD) converter. The lens may collect the light of the subject to form an optical image in a captured area, and the pixel may output the light input through the lens as an analog image signal. The AD converter may convert an analog image signal into a digital image signal and output the converted signal. The camera 110 may be arranged to capture a front direction of the electronic apparatus 100, and may capture a user present on the front of the electronic apparatus 100 to generate a captured image.

The communication interface 120 is configured to communicate with various types of external devices according to various types of communication methods. The communication interface 120 may include a wireless communication module or a wired communication module. Each communication module may be implemented as at least one hardware chip.

The wireless communication module may be a module that wirelessly communicates with an external device. For example, the wireless communication module may include at least one of a Wi-Fi module, a Bluetooth module, an infrared communication module, or other communication modules.

The Wi-Fi module and the Bluetooth module perform communication using a Wi-Fi method and a Bluetooth method, respectively. When using the Wi-Fi module or the Bluetooth module, various connection information such as a service set identifier (SSID) and a session key may be transmitted and received first, and communication information may be transmitted after communication connection.

The infrared ray communication module may perform communication according to infrared data association (IrDA) technology that transmits data wireless to a local area using infrared ray between visible rays and millimeter waves.

The other communication module may include at least one communication chip performing communication according to various communication standards such as Zigbee, 3rd generation (3G), 3rd generation partnership project (3GPP), long term evolution (LTE), LTE advanced (LTE-A), 4th generation (4G), 5th generation (5G), or the like, in addition to the communication methods as described above.

The wired communication module may include at least one of a local area network (LAN) module, Ethernet module, a pair cable, a coaxial cable, an optical cable, an ultra-wide band (UWB) module, or the like.

The processor 130 may control the overall operation of the electronic apparatus 100. To be specific, the processor 130 may function to control overall operations of the electronic apparatus 100.

The processor 130 may be implemented with, for example, and without limitation, a digital signal processor (DSP) for processing of a digital signal, a microprocessor, a time controller (TCON), or the like. The processor 130 may include, for example, and without limitation, one or more among a central processor (CPU), a micro controller unit (MCU), a microprocessor (MPU), a controller, an application processor (AP), a communication processor (CP), an advanced reduced instruction set computing (RISC) machine (ARM) processor, a dedicated processor, or may be defined as a corresponding term. The processor 111 may be implemented in a system on chip (SoC) type or a large scale integration (LSI) type which a processing algorithm is built therein, application specific integrated circuit (ASIC), or in a field programmable gate array (FPGA) type. The processor 130 may perform various functions by executing computer executable instructions stored in the memory.

The display 140 may be implemented as various types of displays such as a liquid crystal display (LCD) panel, organic light emitting diodes (OLED) display panel, a plasma display panel (PDP), and the like. In the display 140, a driving circuit which may be implemented in a type of an a-Si thin film transistor (TFT), a low temperature poly silicon (LTPS) TFT, an organic TFT (OTFT), and a backlight may be included. Further, the display 140 may be implemented as at least one of a touch screen coupled with a touch sensor, a flexible display, a three-dimensional (3D) display, or the like. According to one or more embodiments, the display 140 may include not only a display panel to output an image but also a bezel that houses a display panel. In particular, the bezel according to one or more embodiments may include a touch sensor for sensing a user interaction.

The manipulation interface 150 may be implemented with a device such as a button, a touch pad, a mouse, a keyboard, or a touch screen capable of performing the above-described display function and operation input function. The button may be various types of buttons such as a mechanical button, a touch pad, a wheel, or the like, formed in an arbitrary area such as at least one of a front portion, a side portion, a back portion, or the like, of the outer surface of the main body of the electronic apparatus 100.

The memory 160 may be implemented as an internal memory such as, for example, and without limitation, a read-only memory (ROM) (for example, electrically erasable programmable read-only memory (EEPROM)), a random-access memory (RAM) or a memory separate from the processor 130. In this case, the memory 160 may be implemented as at least one of a memory embedded within the electronic apparatus 100 or a memory detachable from the electronic apparatus 100 according to the usage of data storage. For example, the data for driving the electronic apparatus 100 may be stored in the memory embedded within the electronic apparatus 100, and the data for upscaling of the electronic apparatus 100 may be stored in the memory detachable from the electronic apparatus 100.

The memory embedded in the electronic apparatus 100 may be implemented as at least one of a volatile memory such as a dynamic random access memory (DRAM), a static random access memory (SRAM), a synchronous dynamic random access memory (SDRAM), or a non-volatile memory (for example, one time programmable ROM (OTPROM), programmable ROM (PROM), erasable and programmable ROM (EPROM), electrically erasable and programmable ROM (EEPROM), mask ROM, flash ROM, a flash memory (for example, NAND flash or NOR flash), a hard disk drive (HDD) or a solid state drive (SSD). In the case of a memory detachably mounted to the electronic apparatus 100, the memory may be implemented as a memory card (for example, a compact flash (CF), secure digital (SD), micro secure digital (micro-SD), mini secure digital (mini-SD), extreme digital (xD), multi-media card (MMC), etc.), an external memory (for example, a universal serial bus (USB) memory) connectable to the USB port, or the like.

The speaker 170 may be configured to output not only various audio data but also various notification sounds or voice message.

The microphone 180 may include an element to receive a user voice or other sound and convert to audio data. The microphone 180 may receive the user voice in an active state. For example, the microphone 180 may be integrally formed as an integral unit on at least one of an upper side, a front side direction, a side direction, or the like of the electronic apparatus 100. The microphone 180 may include various configurations such as a microphone for collecting user voice in an analog format, an amplifier circuit for amplifying the collected user voice, an audio-to-digital (A/D) conversion circuit for sampling the amplified user voice to convert into a digital signal, a filter circuitry for removing a noise element from the converted digital signal, or the like.

Figure 4:
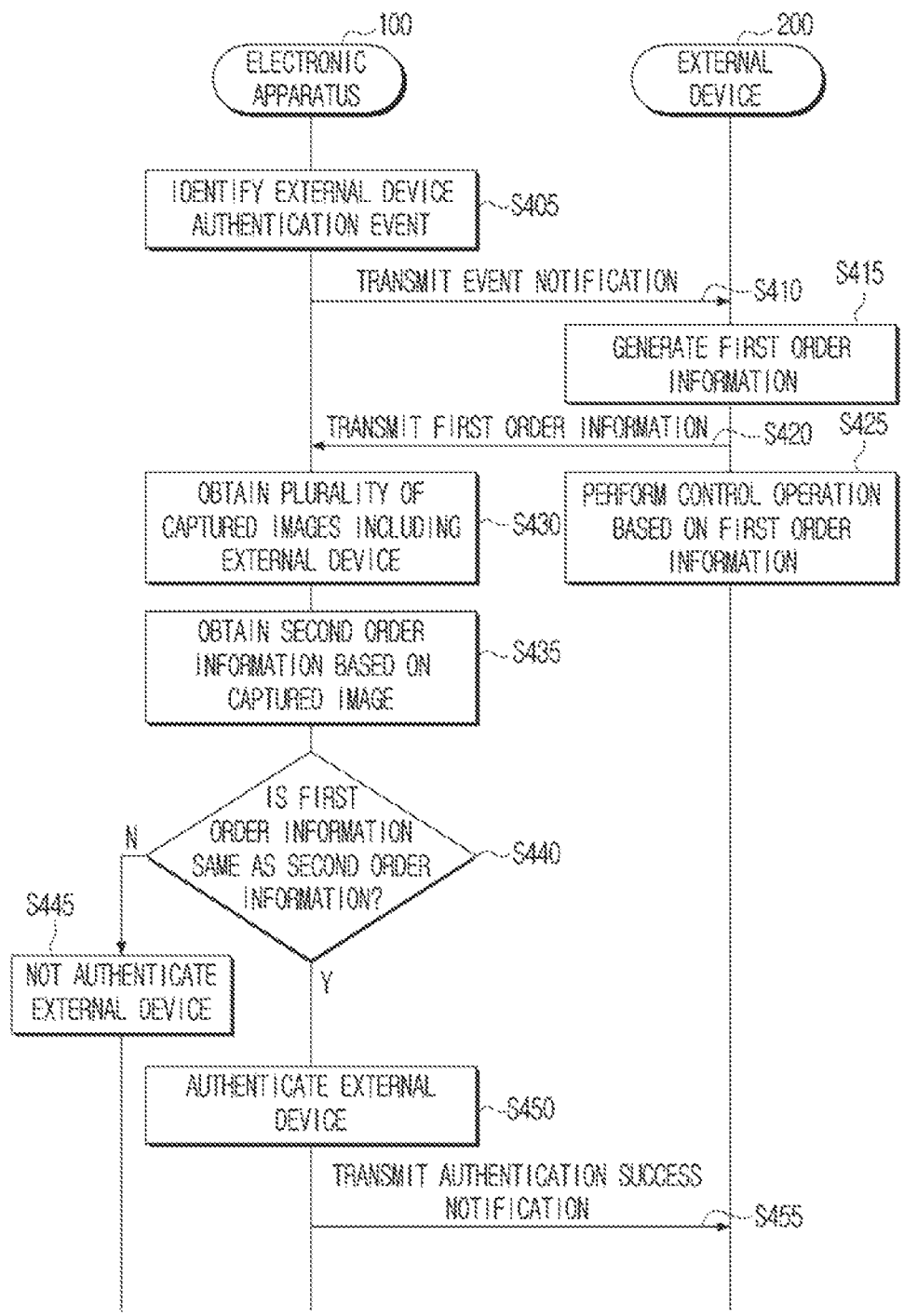
FIG. 4 is a flowchart illustrating an operation of analyzing an operation of an external device through a captured image according to one or more embodiments of the disclosure.

FIG. 4 is a flowchart illustrating an operation of analyzing an operation of an external device 200 through a captured image according to an embodiment of the disclosure.

Referring to FIG. 4, the electronic apparatus 100 may identify the authentication event of the external device 200 in operation S405. The authentication event of the external device 200 may mean an event requiring authentication regarding the external device 200.

The authentication event of the external device 200 may include at least one of an event related to network connection, an event in which a user input for connecting to another device is received, an event in which a user input for connecting to an external device 200 is received, an event in which a communication signal is received from an external device, or an event in which a communication connection request is received from an external device.

The event related to network connection may include at least one of an event in which network connection is newly made, an event requiring network re-connection, or an event in which network connection information is changed.

When an authentication event of the external device 200 is identified, the electronic apparatus 100 may transmit an event notification to the external device 200. The event notification may include information indicating that an event has occurred. In addition, the event notification may include information for notifying occurrence of an event and control command information for generating order information in the external device 200.

The external device 200 may receive an event notification from the electronic apparatus 100. When an event notification is received, the external device 200 may generate first order information in operation S415. The first order information may include an order of operations performed in the external device 200. The first order information may indicate a randomly generated order among a plurality of operations that may be performed in the external device 200.

For example, it is assumed that the external device 200 is an air conditioner. Among a plurality of operations that may be performed in an air conditioner, the external device 200 may generate, as first order information, the order of a blow fan opening, LED power-on, blow fan closing, LED turn-off, and the like.

According to one or more embodiments, the first order information may include a preset operation order. Each device may include its own operation order. The first order information may include an operation order of each device.

When the first order information is generated, the external device 200 may transmit the first order information to the electronic apparatus 100 in operation S420. The external device 200 may sequentially perform a control operation based on the first order information in operation S425.

The electronic apparatus 100 may receive first order information from the external device 200. In addition, the electronic apparatus 100 may obtain a plurality of captured images including the external device 200 in operation S430. In order to capture a plurality of operations performed in the external device 200, the electronic apparatus 100 may obtain at least one captured image.

According to one or more embodiments, the electronic apparatus 100 may obtain a captured image per preset time unit.

According to one or more embodiments, the electronic apparatus 100 may obtain a serial captured image (e.g., moving image).

The electronic apparatus 100 may obtain a captured image for a preset time. The electronic apparatus 100 may obtain a total required time of an operation performed by the first order information. According to one or more embodiments, the first order information may include time information for performing a plurality of operations included in the first order information. The electronic apparatus 100 may obtain a captured image based on time information included in the first order information.

For example, time information indicating that a time required for performing a plurality of operations in the first order information is 10 seconds may be included. When the first order information is received, the electronic apparatus 100 may obtain a captured image for ten seconds. When ten seconds have elapsed, the electronic apparatus 100 may analyze the captured image and may obtain second order information.

When a captured image is obtained, the electronic apparatus 100 may obtain second order information based on the captured image in operation S435. The electronic apparatus 100 may input a captured image to an image analysis model. The image analysis model may be a model for determining which operation has been performed on a captured image input as input data. The image analysis model may output operation information as output data by using the captured image as input data. The electronic apparatus 100 may obtain second order information by connecting a plurality of operation information acquired through an image analysis model in a time order.

When the second order information is obtained, the electronic apparatus 100 may determine whether the first order information is the same as the second order information in operation S440. The electronic apparatus 100 may determine whether the order of the plurality of operations included in the first order information matches the order of the plurality of operations included in the second order information.

If the first order information and the second order information are not the same in operation S440-N, the electronic apparatus 100 may determine that the external device 200 is not authenticated in operation S445. The non-authentication indicates that authentication has failed. The electronic apparatus 100 may determine that the authentication of the external device 200 has failed.

If the first order information and the second order information are the same in operation S440-Y, the electronic apparatus 100 may determine that the external device 200 has been authenticated in operation S450. In addition, the electronic apparatus 100 may transmit an authentication success notification to the external device 200 in operation S455. The authentication success notification may include information for approving (or allowing) the network connection to the external device 200.

The external device 200 may receive an authentication success notification from the electronic apparatus 100. If the authentication success notification is received, communication connection between the external device 200 and the electronic apparatus 100 may be made.

The electronic apparatus 100 may obtain a capturing start point before obtaining a captured image. In addition, the at least one processor 130 may determine whether the external device 200 is authenticated within a threshold time from a capturing start time point. When the external device 200 is not authenticated within the threshold time, the electronic apparatus 100 may determine that the external device 200 is not authenticated.

Figure 5:
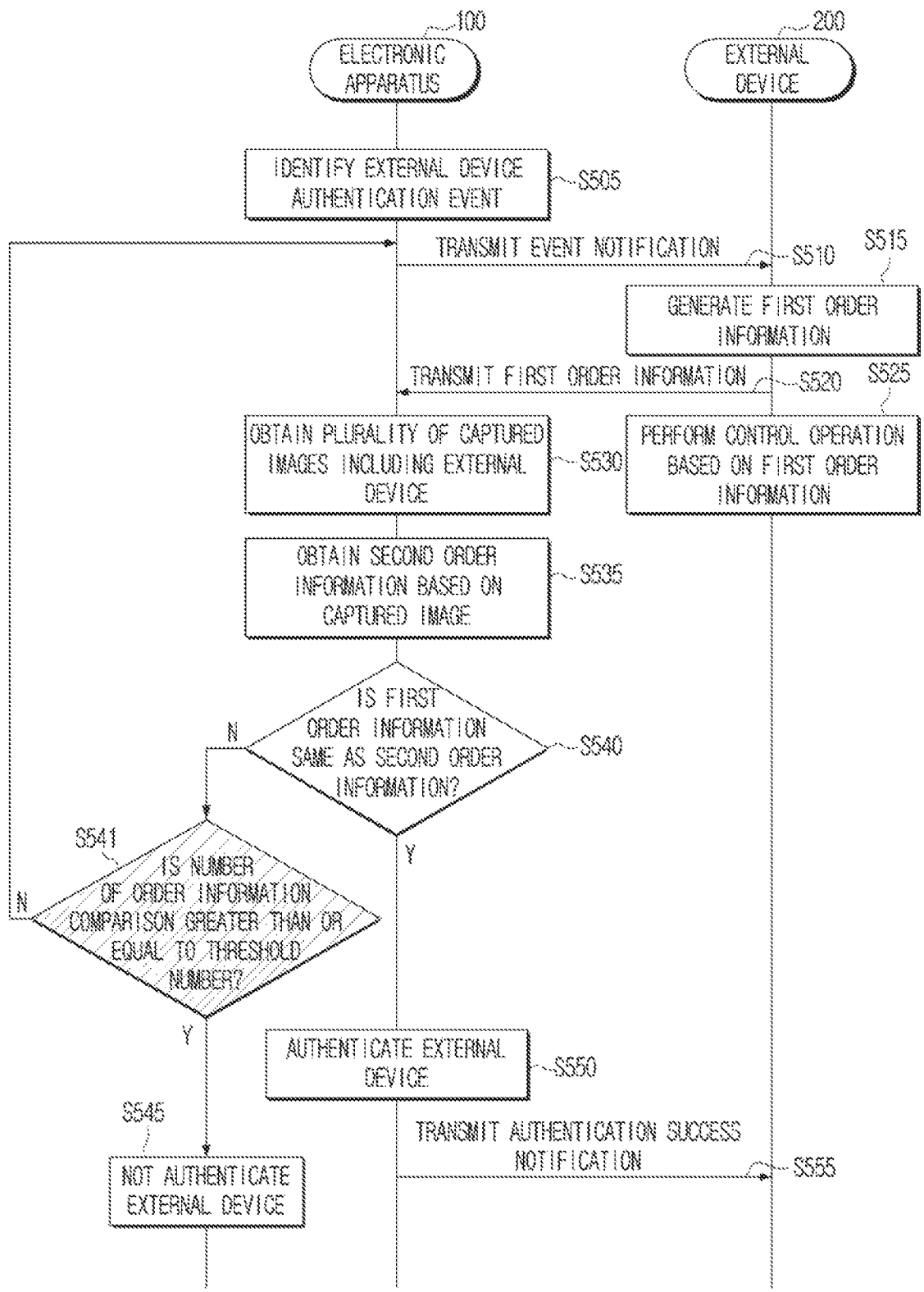
FIG. 5 is a flowchart illustrating an operation of considering the number of times the order information is compared according to one or more embodiments of the disclosure.

FIG. 5 is a flowchart illustrating an operation of considering the number of times the order information is compared according to an embodiment of the disclosure.

The operations S505, S510, S515, S520, S525, S530, S535, S540, S545, S550, S555 of FIG. 5 may correspond to S405, S410, S415, S420, S425, S430, S435, S440, S445, S450, S455 of FIG. 4. Therefore, a duplicate description will be omitted.

When the first order information is not the same as the second order information in operation S540, the electronic apparatus 100 may identify whether the number of order information comparison is greater than or equal to a threshold number in operation S541.

Specifically, an electronic apparatus 100 may compare first order information and second order information. The electronic apparatus 100 may obtain a comparison result of the first order information and the second order information. When the first order information and the second order information do not match, the electronic apparatus 100 may count a mismatch result. The number of times the mismatch result is obtained may be described as the number of comparison (or the number of mismatches). The electronic apparatus 100 may identify whether the number of comparison, which is the number of operations of comparing order information, is greater than or equal to a threshold number of times.

If the number of comparison is less than the threshold number of times in operation S541-N, the electronic apparatus 100 and the external device 200 may repeat operations S510 to S541. The electronic apparatus 100 may re-transmit the event notification transmission operation to the external device 200 to receive the first order information again. The received first order information may be different from the previously received first order information, since the first order information is randomly generated whenever the first order information is generated in the external device 200. The electronic apparatus 100 may also newly obtain a captured image.

When the number of comparison is greater than or equal to a threshold number in operation S541-Y, the electronic apparatus 100 may determine that an external device is not authenticated in operation S545.

Figure 6:
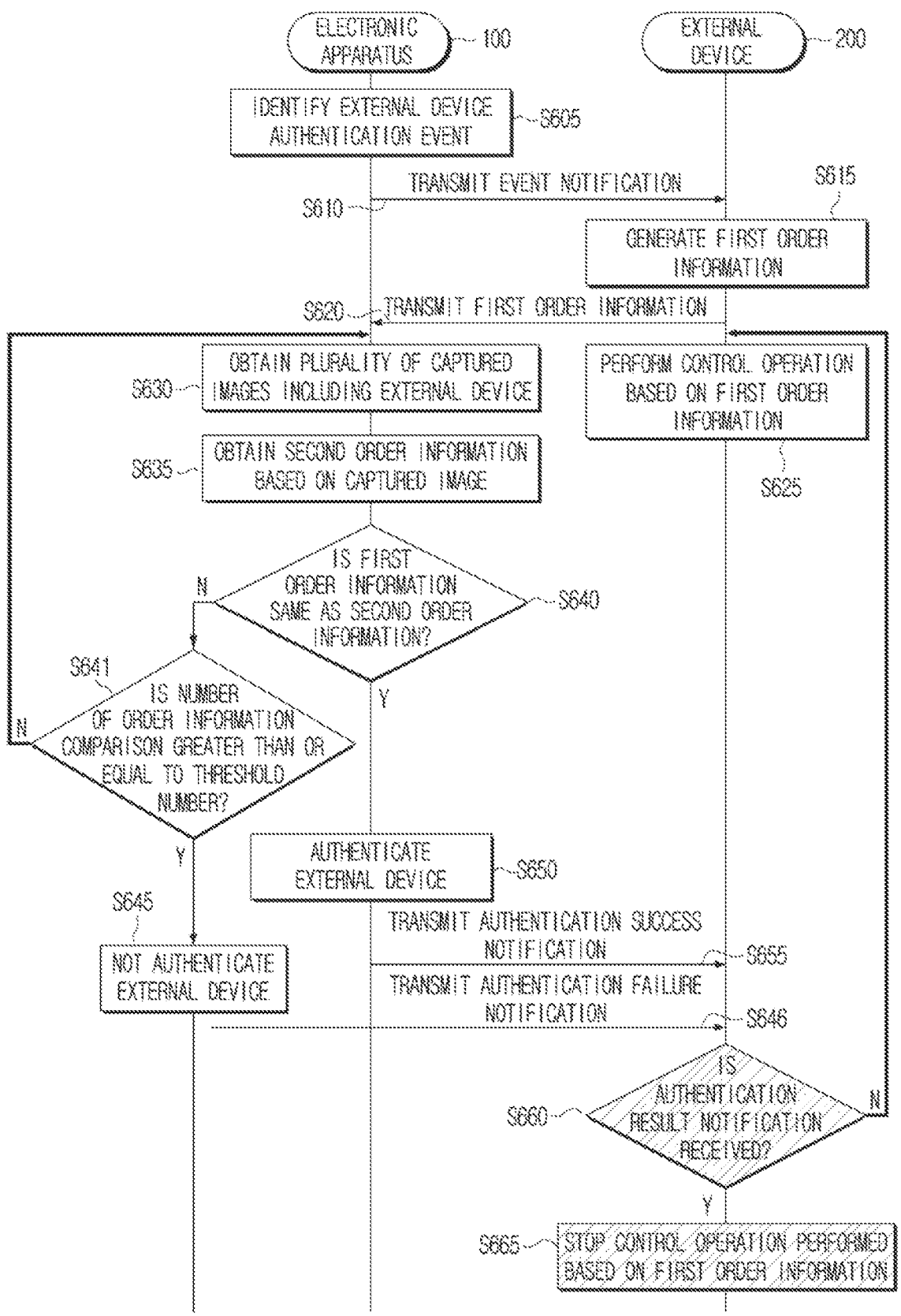
FIG. 6 is a flowchart illustrating an embodiment in which an external device repeatedly performs an operation until an authentication result is received.

FIG. 6 is a flowchart illustrating an embodiment in which an external device 200 repeatedly performs an operation until an authentication result is received according to an embodiment of the disclosure.

The operations S605, S610, S615, S620, S625, S630, S635, S640, S641, S645, S646, S650, S655, S660 of FIG. 6 may correspond to S505, S510, S515, S520, S525, S530, S535, S540, S541, S545, S546, S550, S555, S560 of FIG. 5. Therefore, a duplicate description will be omitted.

When the number of comparison (i.e., the number of mismatches) is less than a threshold number in operation S641-N, the electronic apparatus 100 and the external device 200 may repeat the operations S625 to S641.

In the embodiment of FIG. 5, the electronic apparatus 100 transmits a new event notification to the external device 200, and the external device 200 generates new first order information. However, in the embodiment of FIG. 6, the external device 200 may repeatedly perform the first order information generated once, and the electronic apparatus 100 may obtain the captured image repeatedly.

When the number of comparison is greater than or equal to a threshold number in operation S641-Y, the electronic apparatus 100 may determine that the external device 200 is not authentication in operation S645. In addition, the electronic apparatus 100 may transmit an authentication failure notification to the external device 200 in operation S646.

The external device 200 may receive an authentication success notification through operation S655 or receive an authentication failure notification through operation S646.

The external device 200 may identify whether an authentication result notification is received in operation S660.

When the external device 200 receives an authentication result notification (authentication success notification or authentication failure notification) in operation S660, the a control operation performed based on the first order information may be stopped in operation S665.

When the external device 200 does not receive an authentication result notification (authentication success notification or authentication failure notification) in operation S660-N, the electronic apparatus 100 may perform a control operation repeatedly based on the first order information in operation S625.

Figure 7:
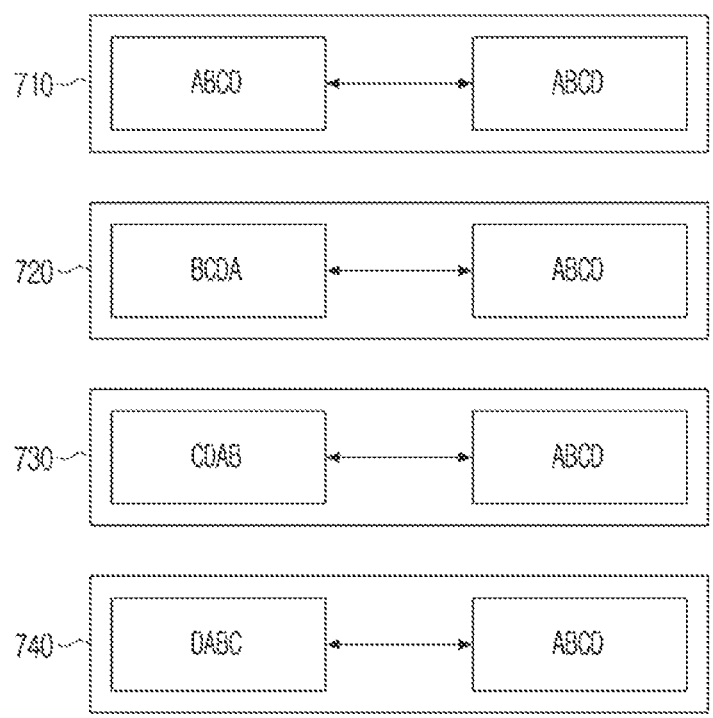
FIG. 7 is a diagram illustrating an order comparison process according to one or more embodiments of the disclosure.

FIG. 7 is a diagram illustrating an order comparison process according to one or more embodiments.

Referring to FIG. 7, there may be one or more embodiments for comparing the first order information and the second order information. It is assumed that the first order information generated by the external device 200 is "ABCD". The electronic apparatus 100 may obtain second order information by obtaining a captured image obtained by capturing the exterior of the external device 200. The electronic apparatus 100 may determine whether the first order information and the second order information are the same. It is assumed that the electronic apparatus 100 repeatedly obtains a captured image, and the external device 200 repeatedly performs an operation according to the first order information.

Referring to embodiment 710, the first order information may be "ABCD" and second order information may be "ABCD". The electronic apparatus 100 may determine that the first order information and the second order information are the same.

When receiving the first order information ("ABCD"), the electronic apparatus 100 may determine that the order information of "ABCD", "BCDA", "CDAB", and "DACB" may be obtained through a captured image. Therefore, the electronic apparatus 100 may determine that the first order information and the second order information match not only in embodiment 710 but also embodiments 720, 730, 740.

Referring to embodiment 720, the first order information may be "ABCD" and the second order information may be "BCDA". The start point of the operation performed by the external device 200 and the capturing time point of the electronic apparatus 100 may be slightly different. Therefore, the electronic apparatus 100 may not capture A operation performed by the external device 200 first and may capture B operation first. The electronic apparatus 100 may determine the second order information as "BCDA". The electronic apparatus 100 may determine that the second order information of "BCDA" is the same as the first order information "ABCD".

Referring to embodiment 730, the first order information may be "ABCD" and the second order information may be "CDAB". A start time of an operation performed by the external device 200 and a capturing time point of the electronic apparatus 100 may be partially different from each other. Therefore, the electronic apparatus 100 may not first capture an A operation performed by the external device 200 and may capture the image from the C operation. The electronic apparatus 100 may determine the second order information as "CDAB". The electronic apparatus 100 may determine that the second order information of the "CDAB" is the same as the first order information ("ABCD").

Referring to the embodiment 740, the first order information may be "ABCD" and the second order information may be "DABC". A start time of an operation performed by the external device 200 and a capturing time point of the electronic apparatus 100 may be partially different from each other. Therefore, the electronic apparatus 100 may not first capture an A operation performed by the external device 200 and capture the image from the D operation. The electronic apparatus 100 may determine the second order information as "DABC". The electronic apparatus 100 may determine that the second order information of the "DABC" is the same as the first order information ("ABCD").

If the start time and end time of operation are not clearly known, the order of operations may be variously interpreted as described in FIG. 7. According to one or more embodiments, the electronic apparatus 100 and the external device 200 may clearly distinguish a start time point and an end time point. This is described in FIGS. 15, 16, and 20.

Figure 8:
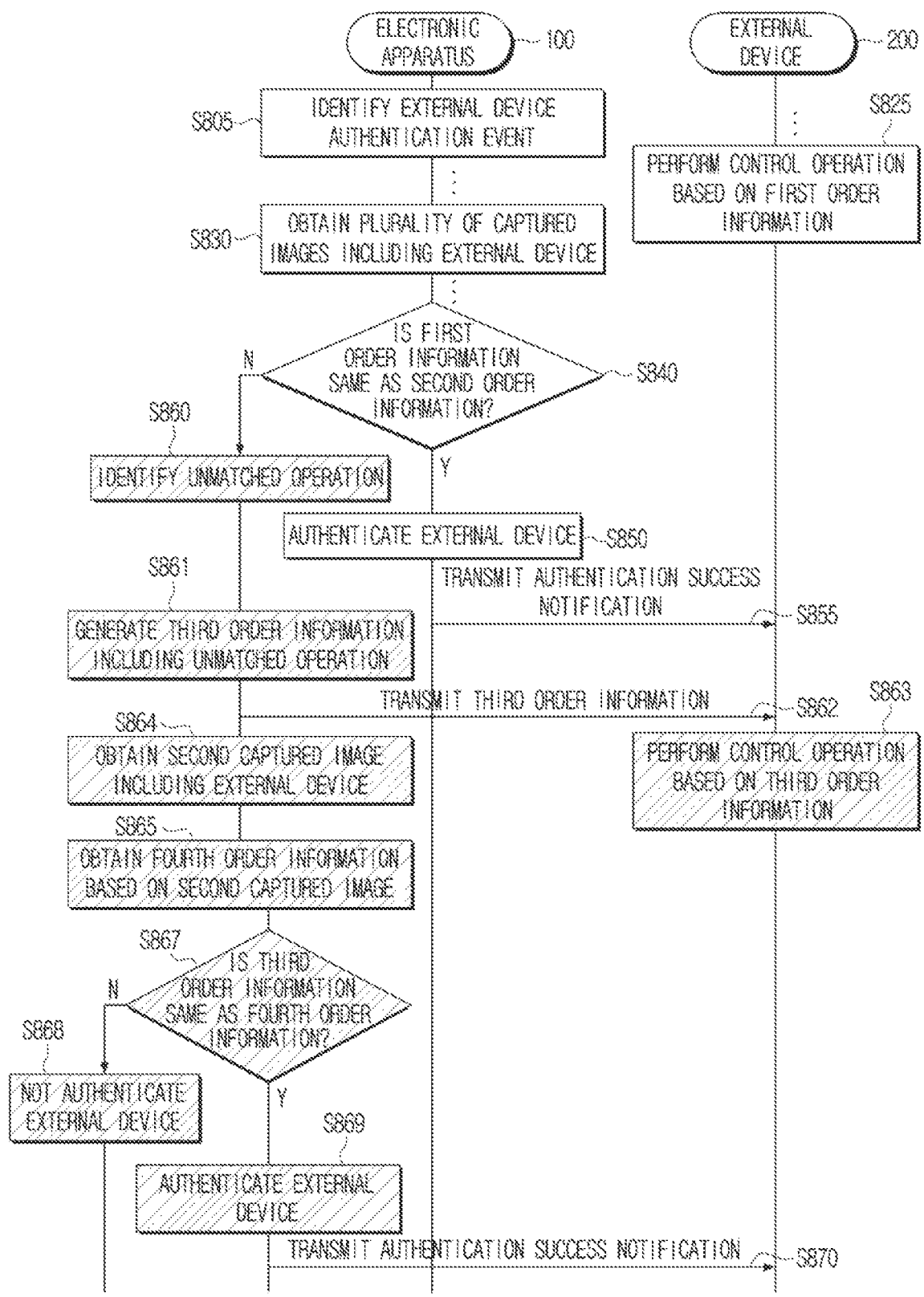
FIG. 8 is a flowchart illustrating an operation of newly capturing only an unmatched operation according to one or more embodiments of the disclosure.

FIG. 8 is a flowchart illustrating an operation of newly capturing only an unmatched operation according to an embodiment of the disclosure.

In the embodiment of FIG. 8, operations S405 to S455 of FIG. 4 may be applied. The operations S805, S825, S830, S840, S850, and S855 may correspond to S405, S425, S430, S440, S450, S455 of FIG. 4. Therefore, a duplicate description will be omitted. However, there may be a slight difference in S445 of FIG. 4. The captured image obtained in S830 (corresponding to S430) may be recited as the first captured image.

When the first order information and the second order information are not matched in operation S840-N, the electronic apparatus 100 may identify the unmatched operation in operation S860.

The unmatched operation may refer to an operation that an operation included in the first order information is not included in the second order information. For example, it is assumed that the first order information includes "ABCD" and second order information includes "ABC". The unmatched operation may be "D".

The unmatched operation may mean an operation in which an operation included in the first order information is not included in the second order information. For example, it is assumed that "ABCD" is included in the first order information, and "AB" is included in the second order information. The unmatched operation may be "CD".

Also, the unmatched operation may mean an operation different from the second order information during the operation included in the first order information. For example, it is assumed that "ABCD" is included in the first order information and "ABCE" is included in the second order information. The unmatched operation may be "D".

The electronic apparatus 100 may generate the third order information including an unmatched operation in operation S861. The electronic apparatus 100 may transmit the third order information to the external device 200 in operation S862.

The external device 200 may receive the third order information from the electronic apparatus 100. The external device 200 may perform a control operation based on the third order information in operation S863.

After transmitting the third order information to the external device 200, the electronic apparatus 100 may obtain a second captured image including the external device 200 in operation S864. The electronic apparatus 100 may obtain fourth order information based on the second captured image in operation S865. The electronic apparatus 100 may determine whether the third order information and the fourth order information are matched in operation S867.

When the third order information is not matched with the fourth order information in operation S867-N, the electronic apparatus 100 may decide that the external device 200 is unauthenticated in operation S868.

When the third order information is the same as the fourth order information in operation S867-Y, the electronic apparatus 100 may determine that the external device 200 is authenticated in operation S869. Then, the electronic apparatus 100 may transmit an authentication success notification to the external device 200 in operation S870.

Figure 9:
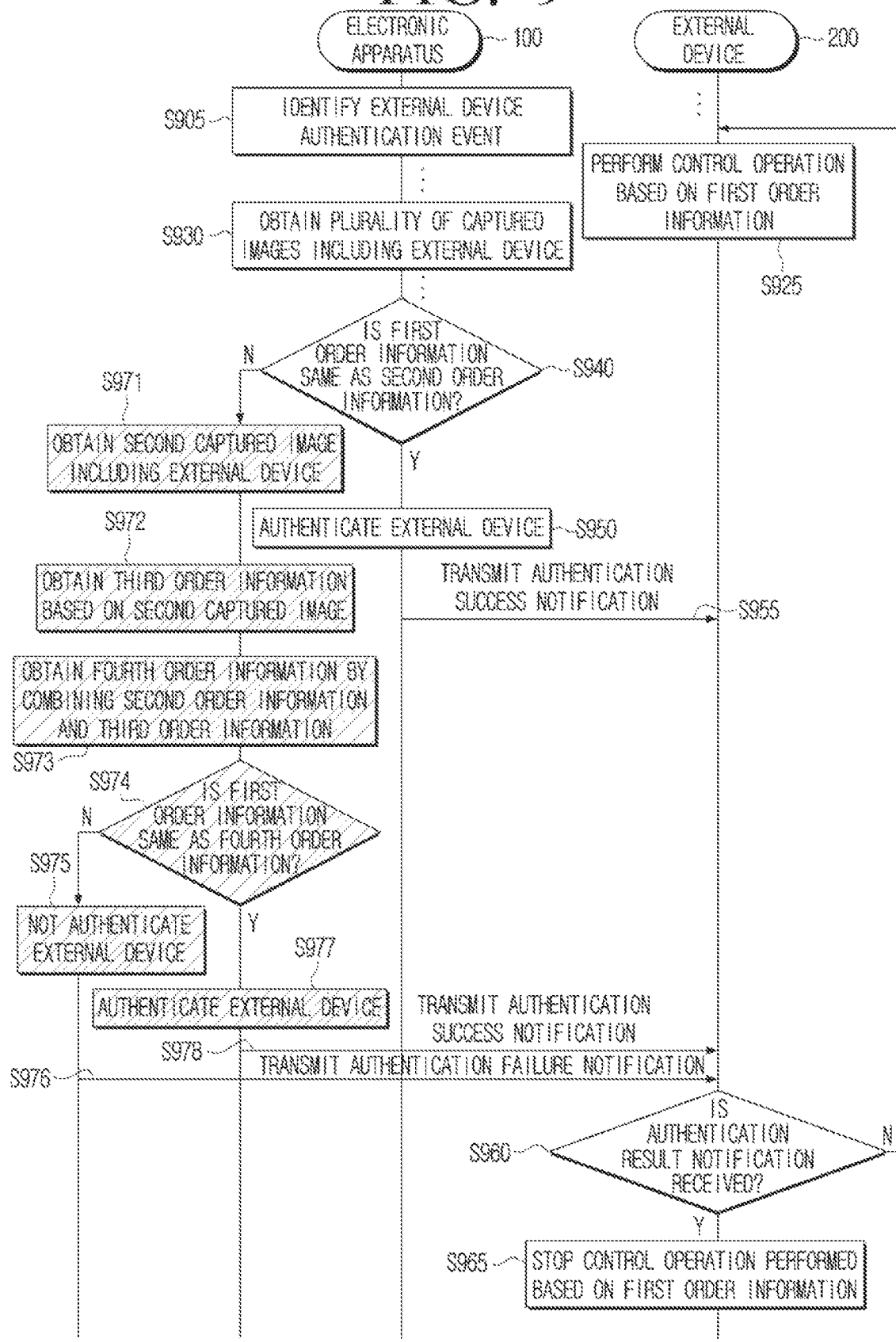
FIG. 9 is a flowchart illustrating combining order information obtained from a captured image according to one or more embodiments of the disclosure.

FIG. 9 is a flowchart illustrating combining order information obtained from a captured image according to an embodiment of the disclosure.

In the embodiment of FIG. 9, operations S605 to S665 of FIG. 6 may be applied. The operations S905, S925, S930, S940, S950, S955, S960, S965 may correspond to S605, S625, S630, S640, S650, S655, S660, S665 of FIG. 6. Therefore, a duplicate description will be omitted. However, there may be a slight difference in S641 of FIG. 6. The captured image obtained in S930 (corresponding to S630) may be recited as the first captured image.

When the first order information and the second order information are not matched in operation S940-N, the electronic apparatus 100 may obtain a second captured image including the external device 200 in operation S971. The electronic apparatus 100 may obtain the third order information based on the second captured image in operation S972. The electronic apparatus 100 may obtain the fourth order information by combining the second order information and the third information in operation S973. The electronic apparatus 100 may generate one order information by combining order information obtained at different time points.

For example, it is assumed that the electronic apparatus 100 obtains the second order information at the first time point and obtain the third order information at the second time point. The second time point may be a time point after the time determined that the second order information obtained at the first time point is not matched with the first order information. The electronic apparatus 100 may generate new fourth order information by combining the second order information and the third order information.

The electronic apparatus 100 may determine whether the first order information is matched with the fourth information in operation S974.

When the first order information is not matched with the fourth order information in operation S974-N, the electronic apparatus 100 may decide that the external device 200 is not authenticated in operation S975. The electronic apparatus 100 may transmit the authentication failure notification to the external device 200 in operation S976.

When the first order information and the fourth order information are matched in operation S974-Y, the electronic apparatus 100 may decide that the external device 200 is authenticated in operation S977. The electronic apparatus 100 may transmit the authentication success notification to the external device 200 in operation S978.

The external device 200 may repeatedly perform a control operation based on the first order information until an authentication success notification or an authentication failure notification is transmitted. The electronic apparatus 100 may repeatedly perform operations S925, S960, and S965.

Figure 10:
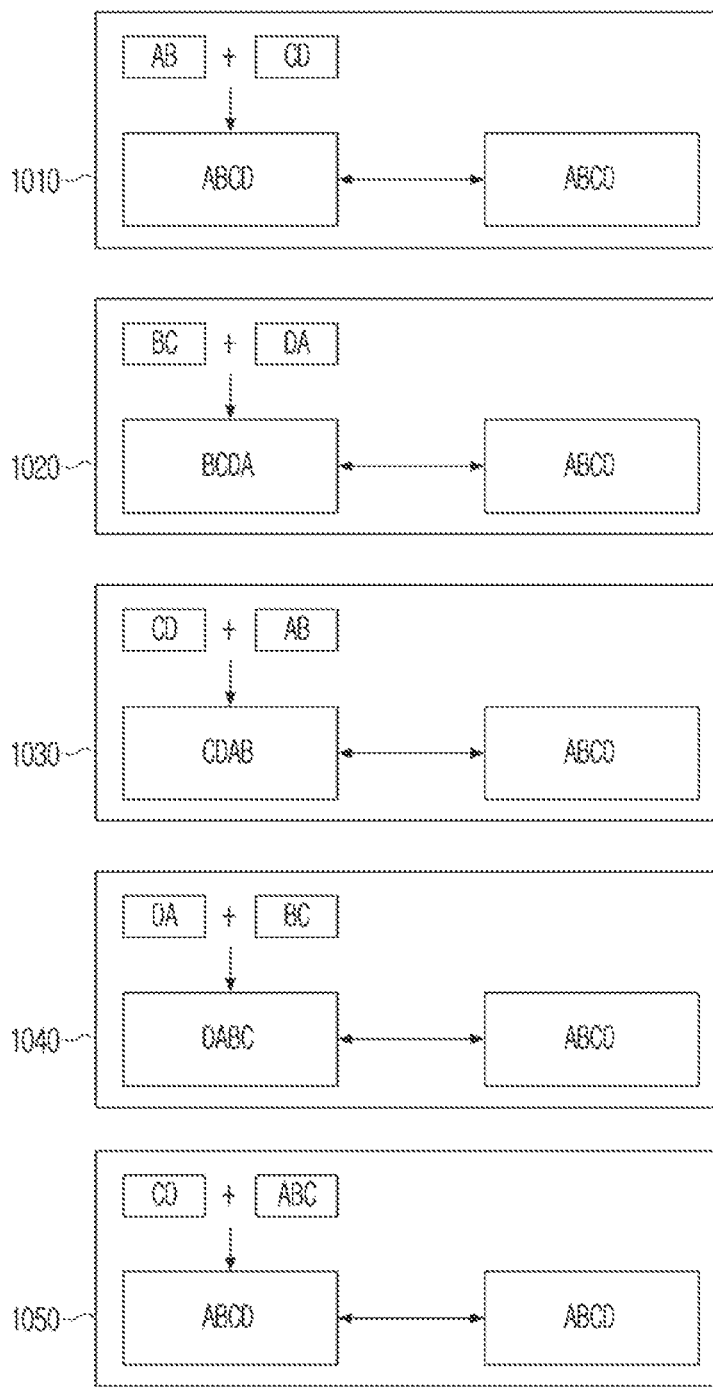
FIG. 10 is a diagram illustrating an order information combining operation according to one or more embodiments of the disclosure.

FIG. 10 is a diagram illustrating an order information combining operation according to multiple embodiments.

Referring to FIG. 10, there are multiple embodiments in which the first order information and the fourth information are compared. The first order information generated by the external device 200 is "ABCD". The electronic apparatus 100 may obtain the second order information by obtaining a captured image by capturing an exterior of the external device 200. The electronic apparatus 100 may identify whether the first order information and the second order information are matched.

When the first order information is not matched with the second order information, the electronic apparatus 100 may obtain a new captured image. The electronic apparatus 100 obtain the third order information based on a new captured image.

The electronic apparatus 100 may generate the fourth order information by combining second order information obtained based on a previously-captured image and third order information obtained based on a newly-captured image. The electronic apparatus 100 may compared the generated fourth generation information and the first order information.

It is assumed that the electronic apparatus 100 repeatedly obtains a captured image and the external device 200 repeats an operation according to the first order information.

Referring to embodiment 1010, the second order information may be "AB" and the third order information may be "CD". The electronic apparatus 100 may obtain the fourth order information "ABCD" by combining the second order information "AB" and the third order information "CD". The electronic apparatus 100 may determine that the first order information and the fourth order information are matched.

When receiving the first order information "ABCD", the electronic apparatus 100 may determine that the order information of "ABCD", "BCDA", "CDAB", and "DACB" may be obtained through a captured image. Therefore, the electronic apparatus 100 may determine that the first order information and the fourth order information are matched in not only embodiment 1010 but also embodiments 1020, 1030, 1040, 1050.

Referring to embodiment 1020, the second order information may be "BC" and the third order information may be "DA". The electronic apparatus 100 may obtain the fourth order information "BCDA" by combining the second order information "BC" and the third order information "DA". There may be a slight difference in the start time point of the operation performed by the external device 200 and a time point of capturing by the electronic apparatus 100. Therefore, the electronic apparatus 100 may not first capture A operation performed by the external device 200 and may capture B operation first. The electronic apparatus 100 may determine that the fourth order information is "BCDA". The electronic apparatus 100 may determine that the fourth order information "BCDA" is matched with the first order information "ABCD".

Referring to embodiment 1030, the second order information may be "CD" and the third order information may be "AB". The electronic apparatus 100 may obtain the fourth order information "CDAB" by combining the second order information "CD" and the third order information "AB". There may be a slight difference between the start time point of the operation performed by the external device 200 and the capturing time point of the electronic apparatus 100. Therefore, the electronic apparatus 100 may not first capture the A operation performed by the external device 200 and may capture C operation first. The electronic apparatus 100 may determine the fourth order information as "CDAB". The electronic apparatus 100 may determine that the fourth order information of "CDAB" is matched with the first order information "ABCD".

Referring to embodiment 1040, the second order information may be "DA" and the third order information may be "BC". The electronic apparatus 100 may obtain the fourth order information "DABC" by combining the second order information "DA" and the third order information "BC". There may be a slight difference between the start time point of the operation performed by the external device 200 and the capturing time point of the electronic apparatus 100. Therefore, the electronic apparatus 100 may not first capture the A operation performed by the external device 200 and may capture D operation first. The electronic apparatus 100 may determine the fourth order information as "DABC". The electronic apparatus 100 may determine that the fourth order information of "DABC" is matched with the first order information "ABCD".

Referring to embodiment 1050, the second order information may be "CD" and the third order information may be "ABC". The electronic apparatus 100 may obtain the fourth order information "ABCD" by combining the second order information "CD" and the third order information "ABC". There may be a slight difference between the start time point of the operation performed by the external device 200 and the capturing time point of the electronic apparatus 100. Therefore, the electronic apparatus 100 may not first capture the A operation performed by the external device 200 and may capture D operation first. In the meantime, the electronic apparatus 100 may combine the second order information "CD" and the third order information "ABC" based on the C operation. The electronic apparatus 100 may determine the fourth order information as "ABCD". The electronic apparatus 100 may determine that the fourth order information of "ABCD" is matched with the first order information "ABCD".

Figure 11:
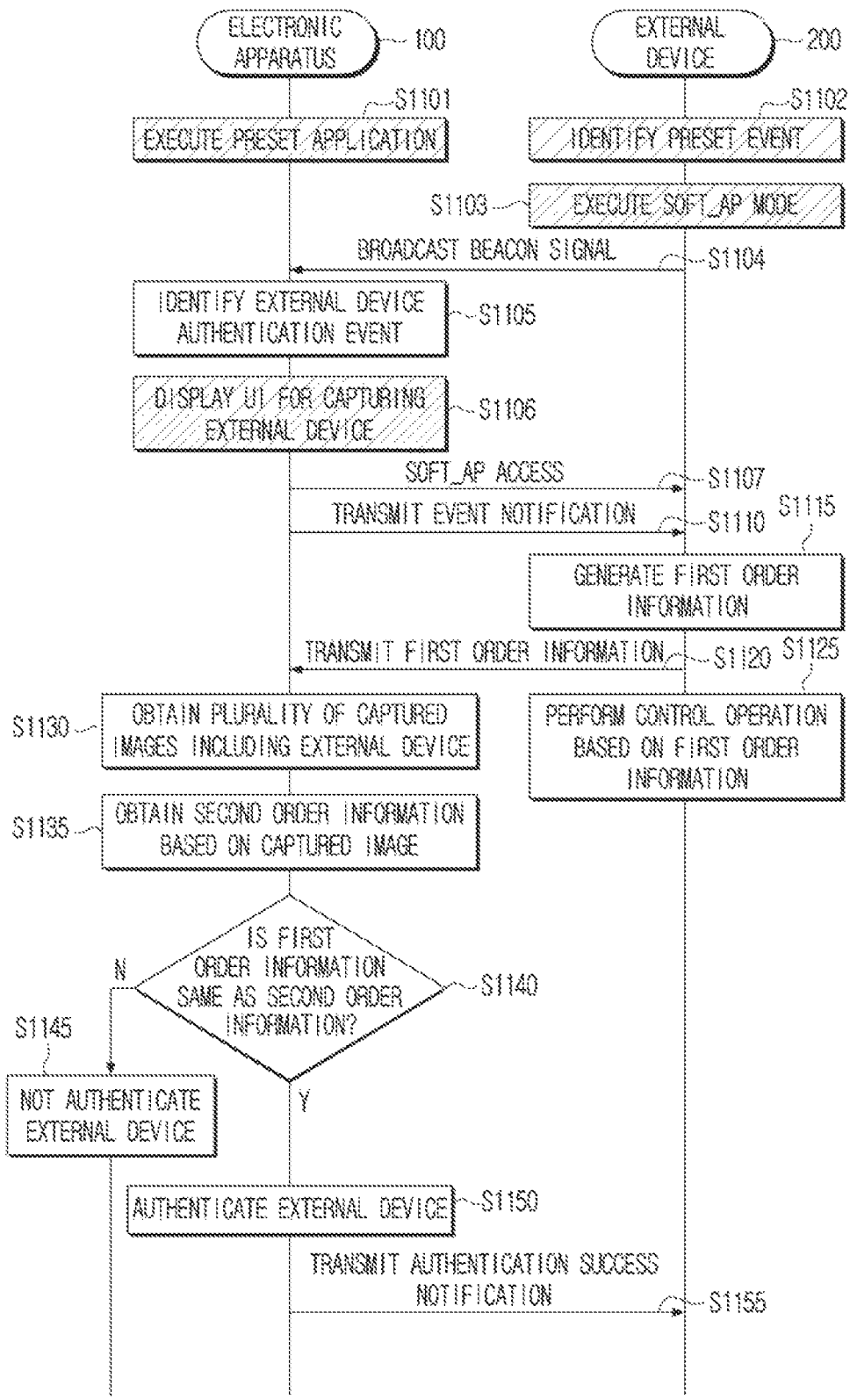
FIG. 11 is a flowchart illustrating an external device connection process according to one or more embodiments of the disclosure.

FIG. 11 is a flowchart illustrating an external device connection process according to an embodiment of the disclosure.

The operations S1105, S1110, S1115, S12120, S1125, S1130, S1135, S1140, S1145, S1150, S1155 of FIG. 11 may correspond to S405, S410, S415, S12120, S425, S430, S435, S440, S445, S450, S455 of FIG. 4.

The electronic apparatus 100 may execute a preset application in operation S1101. The preset application may refer to an application related to connection with the external device 200. The preset application may be an application for performing an authentication operation for connection with the external device 200. The preset application may be a user input.

According to one or more embodiments, an operation S1101 may be omitted.

The external device 200 may identify a preset event. The preset event may include at least one of an event in which the power of the external device 200 is turned on or an event in which a user input for operating the external device 200 in a software enabled access point (AP) mode is received. The Soft AP mode may refer to a mode operating in a wireless AP.

When a preset event is identified, the external device 200 may execute the Soft AP mode.

According to one or more embodiments, operation S1102 may be omitted. Therefore, even without identification of a preset event, the external device 200 may execute Soft AP mode.

After executing the Soft AP mode, the external device 200 may broadcast a beacon signal in operation S1104. The beacon signal may be a Wi-Fi beacon signal or Bluetooth beacon signal.

The electronic apparatus 100 may receive a beacon signal broadcasted by the external device 200. When a beacon signal is received from the external device 200, the electronic apparatus 100 may determine that the external device 200 authentication event has been identified in operation S1105.

When the external device 200 authentication event is identified, the electronic apparatus 100 may display a UI for capturing the external device 200 in operation S1106. The electronic apparatus 100 may provide a user with a UI for guiding the capturing of the external device 200. A user may easily know that an operation of capturing the external device 200 is performed through the UI. A UI for capturing the external device 200 is described in FIG. 12.

When the UI is displayed through S1106, the electronic apparatus 100 may access the Soft AP of the external device 200 in operation S1107. The electronic apparatus 100 and the external device 200 may perform operations S1110 to S1155.

In the meantime, the screen 1200 of FIG. 12 may not be displayed in the embodiment described in FIG. 11, and the screen 1200 of FIG. 12 may be displayed according to one or more embodiments. For example, when receiving first order information from the external device 200, at least one processor 130 may display the screen 1200 of FIG. 12.

FIG. 12 is a diagram illustrating a UI displayed in an external device connection process according to an embodiment of the disclosure.

Referring to FIG. 12, the electronic apparatus 100 may display a screen 1200 for capturing the external device 200. The screen 1200 may include at least one UI related to authentication of the external device 200.

The screen 1200 may include at least one of a UI 1210 for notifying that authentication is required, a UI 1220 for showing an authentication means, a UI 1230 for showing the appearance of the external device 200, a UI 1240 for notifying a user of a guide operation, a UI 1250 for displaying a real-time captured image, and a UI 1260 for starting a capturing operation.

According to one or more embodiments, when a user input to select a UI 1260 is received, the electronic apparatus 100 may obtain a captured image.

According to one or more embodiments, when the user input to select the UI 1260 is not received, the electronic apparatus 100 may capture the external device 200 at a preset time point.

Figure 13:
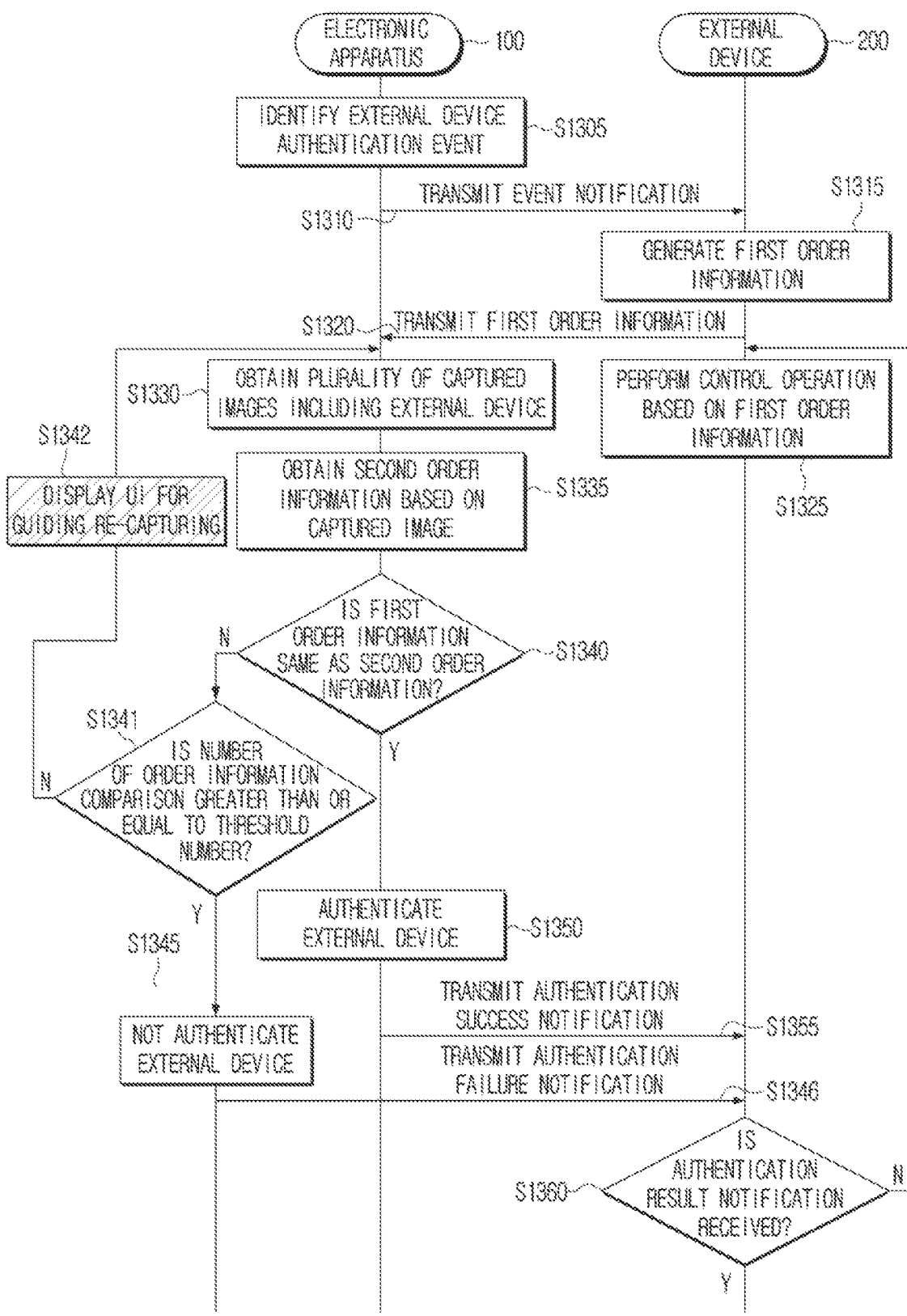
FIG. 13 is a flowchart for guiding re-capturing when order information does not match according to one or more embodiments of the disclosure.

FIG. 13 is a flowchart for guiding re-capturing when order information does not match according to an embodiment of the disclosure.

The operations S1305, S1310, S1315, S1320, S1325, S1330, S1335, S1340, S1341, S1345, S1346, S1350, S1355, S1360 of FIG. 13 may correspond to S605, S610, S615, S620, S625, S630, S635, S640, S641, S645, S646, S650, S655, S660 of FIG. 6. Therefore, a duplicate description will be omitted.

However, if the number of comparison (i.e., the number of mismatches) is less than the threshold number in operation S1341-N, the electronic apparatus 100 may display a UI for guiding the re-capturing in operation S1342. In addition, the electronic apparatus 100 and the external device 200 may repeat operations S1325 to S1341.

When the first order information and the second order information are not matched, the electronic apparatus 100 may display a guide UI for obtaining the captured image again. A user may modify a capturing angle or a capturing target through the guide UI or re-capture an operation order performed by the external device 200.

Figure 14:
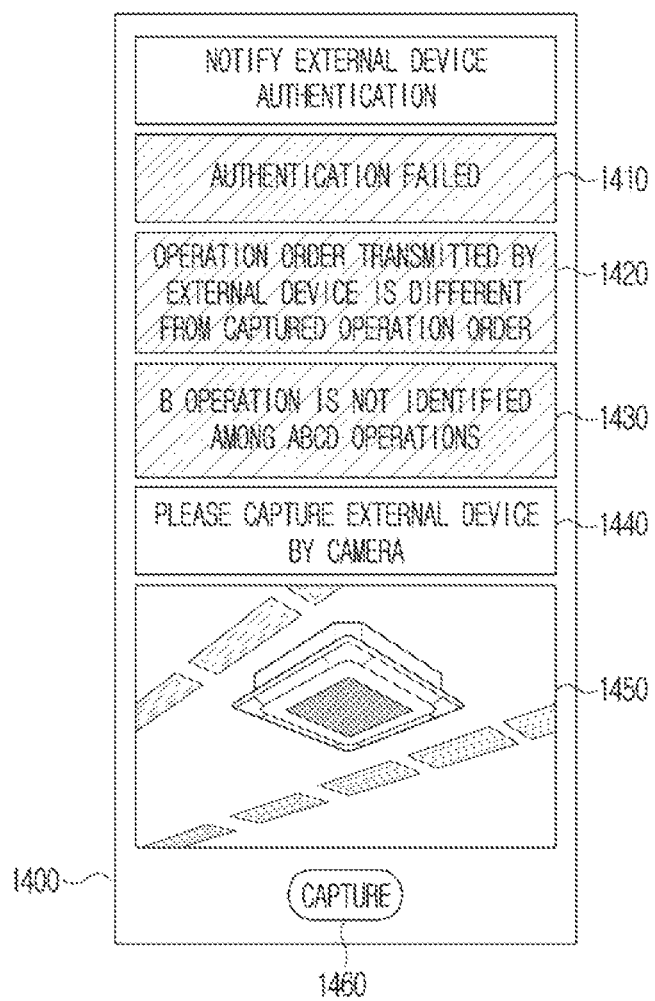
FIG. 14 is a diagram illustrating a UI for guiding re-capturing when order information does not match according to one or more embodiments of the disclosure.

FIG. 14 is a diagram illustrating a UI for guiding re-capturing when order information does not match according to an embodiment of the disclosure.

Referring to FIG. 14, the electronic apparatus 100 may display a screen 1400 for guiding re-capturing. The screen 1400 may include at least one UI related to authentication of the external device 200.

A screen 1400 may include at least one of a UI 1410 indicating that the authentication of the external device 200 has failed, a UI 1420 indicating that the first order information transmitted by the external device 200 is different from the second order information obtained through the captured image, and a UI 1430 indicating a unmatched operation.

The UI 1440 and UI 1450 may correspond to UI 1240, UI 1250 of FIG. 12. Therefore, a duplicate description will be omitted.

Figure 15:
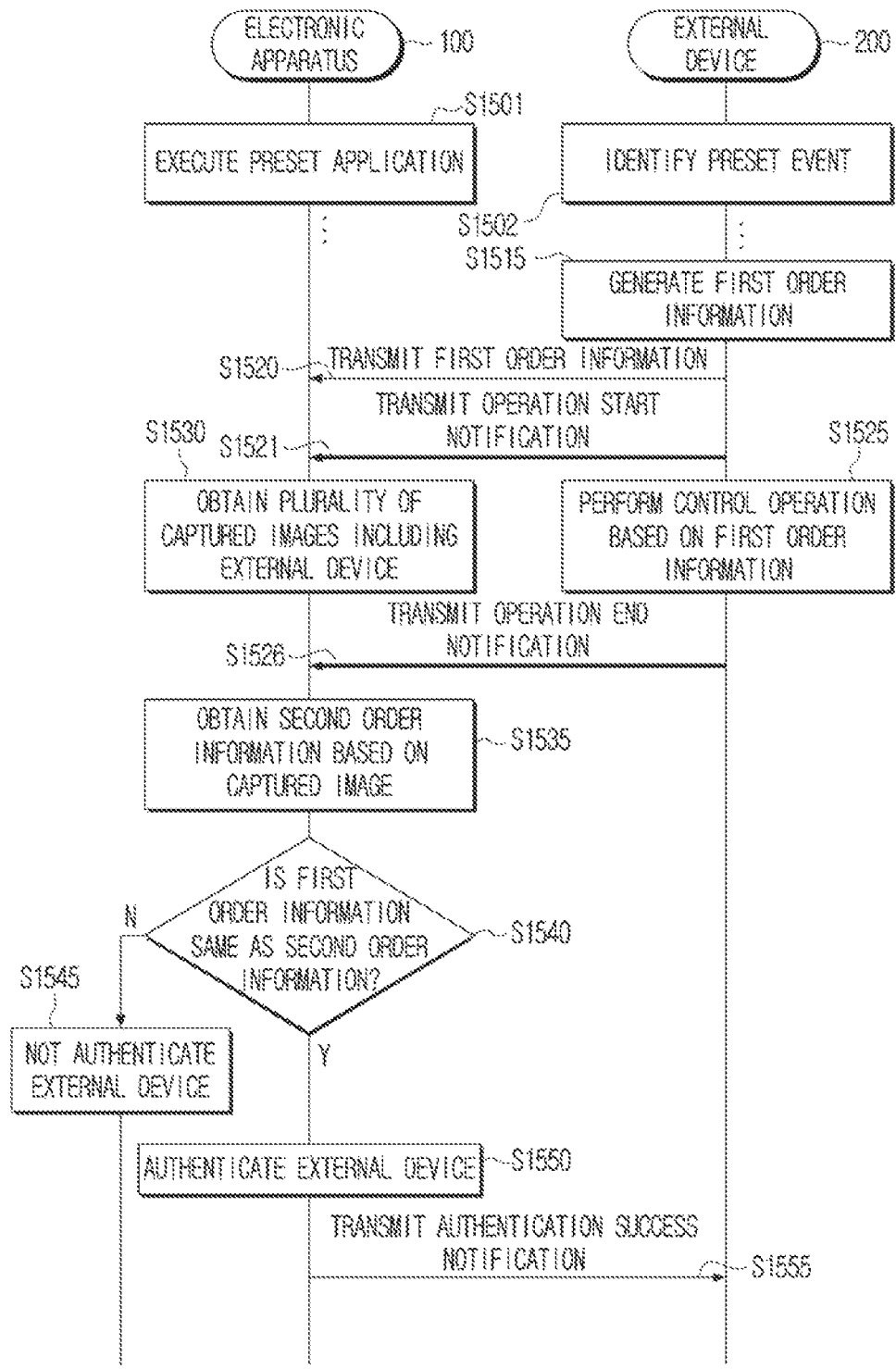
FIG. 15 is a flowchart illustrating an embodiment in which a start notification and an end notification of an operation performed in an external device are transmitted to an electronic apparatus.

FIG. 15 is a flowchart illustrating an embodiment in which a start notification and an end notification of an operation performed in an external device 200 are transmitted to an electronic apparatus 100.

The embodiment of FIG. 15 may be applied with operations S1101 to S1155 of FIG. 11. The operations S1501, S1502, S1515, S1520, S1525, S1530, S1535, S1540, S1545, S1550, S1555 may correspond to S1101, S1102, S1115, S1120, S1125, S1130, S1135, S1140, S1145, S1150, S1155 of FIG. 11. Therefore, a duplicate description will be omitted.

After generating the first order information, the external device 200 may transmit an operation start notification to the electronic apparatus 100 in operation S1521.

According to one or more embodiments, the external device 200 may transmit the first order information to the electronic apparatus 100 and then transmit the operation start notification to the electronic apparatus 100.

According to one or more embodiments, the external device 200 may transmit the first order information and the operation start notification together to the electronic apparatus 100.

Thereafter, the external device 200 may perform a control operation based on the first order information in operation S1525. When the performance of the control operation is completed, the external device 200 may transmit an operation end notification to the electronic apparatus 100 in operation S1526.

The electronic apparatus 100 may receive an operation start notification and an operation end notification from the external device 200. The electronic apparatus 100 may obtain a captured image based on an operation start notification and an operation end notification.

When an operation start notification is received, the electronic apparatus 100 may activate the camera 110 and obtain a captured image. When the operation end notification is received, the electronic apparatus 100 may inactivate the camera 110 and may no longer obtain the captured image.

Thereafter, the electronic apparatus 100 may perform operations S1535 to S1555.

Figure 16:
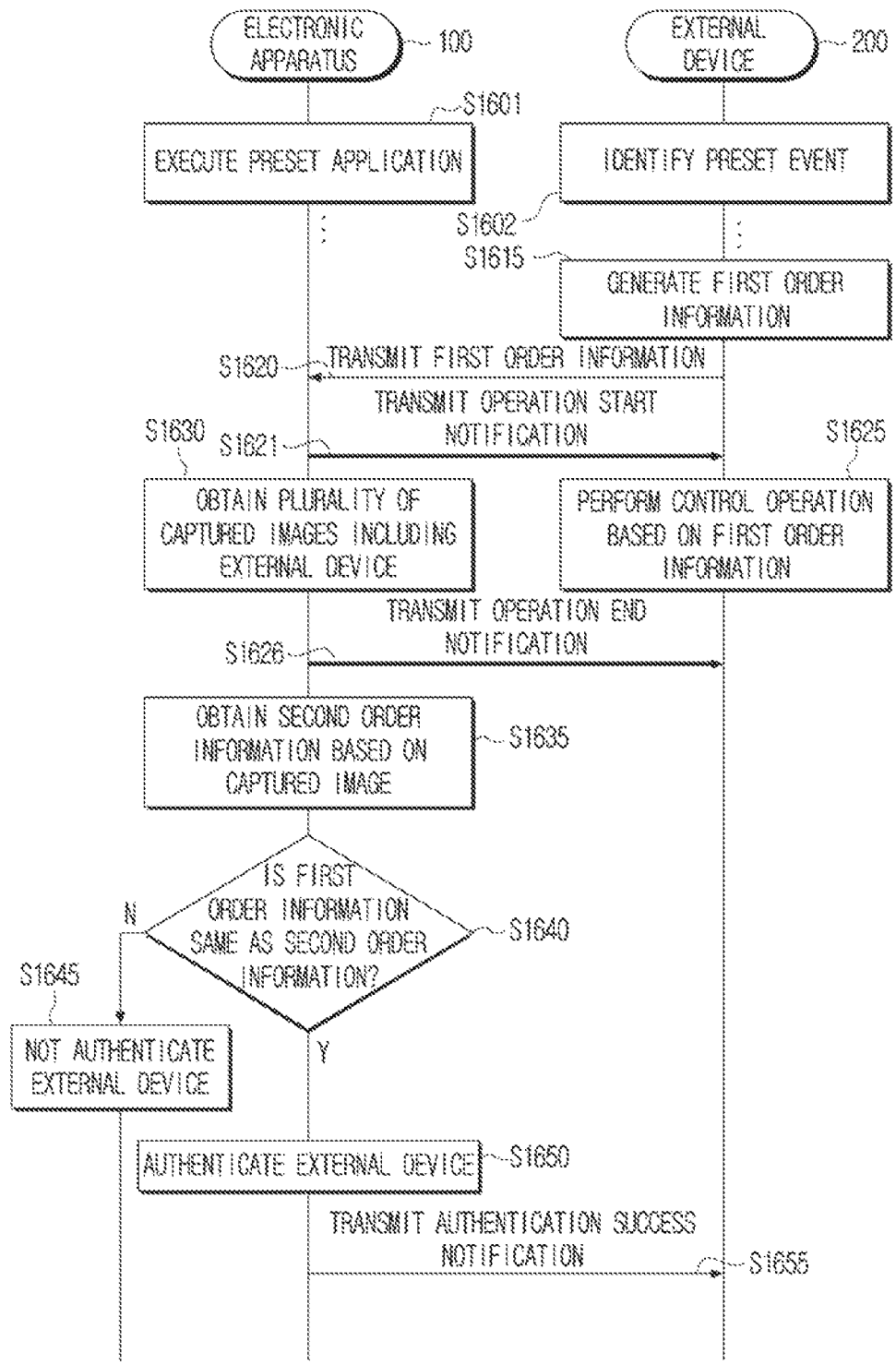
FIG. 16 is a flowchart illustrating an embodiment in which a start notification and an end notification of an operation performed in an electronic apparatus are transmitted to an external device.

FIG. 16 is a flowchart illustrating an embodiment in which a start notification and an end notification of an operation performed in the electronic apparatus 100 are transmitted to an external device 200.

The embodiment of FIG. 16 may be applied with operations S1101 to S1155 of FIG. 11. The operations S1601, S1602, S1615, S1620, S1625, S1630, S1635, S1640, S1645, S1650, S1655 may correspond to S1101, S1102, S1115, S1120, S1125, S1130, S1135, S1140, S1145, S1150, S1155 of FIG. 11. Thus, a duplicate description will be omitted.

When receiving the first order information from the external device 200, the electronic apparatus 100 may transmit an operation start notification to the external device 200.

The external device 200 may receive an operation start notification from the electronic apparatus 100. When an operation start notification is received from the electronic apparatus 100, the external device 200 may perform a control operation based on the first order information in operation S1625. The external device 200 may repeat the operation S1625 until an operation end notification is received.

After transmitting the operation start notification to the external device 200, the electronic apparatus 100 may obtain a plurality of captured images including the external device 200 in operation S1630. When a plurality of captured images are obtained and a preset time elapses, the electronic apparatus 100 may transmit an operation end notification to the external device 200.

The external device 200 may receive an operation end notification from the electronic apparatus 100. When an operation end notification is received from the electronic apparatus 100, the external device 200 may stop a control operation performed based on the first order information.

According to one or more embodiments, operation S1626 (operation of transmitting an operation end notification) may be performed together with operation S1655. The external device 200 may repeat a control operation performed based on the first order information until the external device 200 is authenticated in the electronic apparatus 100.

Figure 17:
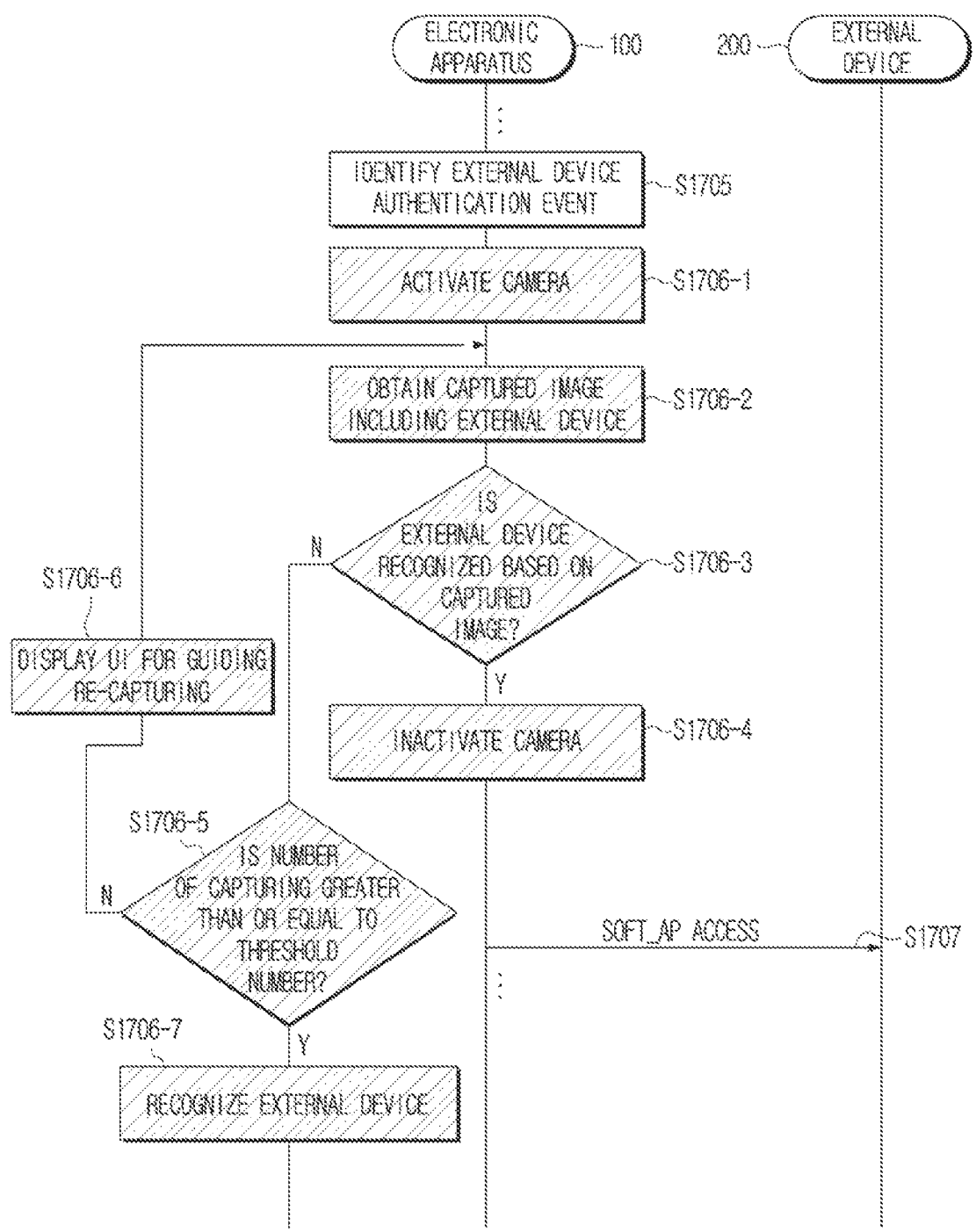
FIG. 17 is a flowchart illustrating an operation of recognizing an external device by activating a camera according to one or more embodiments of the disclosure.

FIG. 17 is a flowchart illustrating an operation of recognizing an external device 200 by activating a camera 110 according to an embodiment of the disclosure.

The embodiment of FIG. 17 may be applied with operations S1101 to S1155 of FIG. 11. Operations S1705 and S1707 may correspond to S1105, S1107 of FIG. 11. Thus, a duplicate description will be omitted.

When an authentication event of the external device 200 is identified, the electronic apparatus 100 may activate the camera 110 in operation S1706-1. The electronic apparatus 100 may obtain a captured image including the external device 200 in operation S1706-2. The electronic apparatus 100 may determine whether the external device 200 is recognized based on the captured image in operation S1706-3. The recognition operation of the external device 200 may be different from the authentication operation of the external device 200. The recognition operation of the external device 200 may simply refer to an operation of determining whether the external device 200 is included in the captured image.

It is possible to determine whether the external device 200 itself is in the vicinity of the electronic apparatus 100 before comparing the first order information with the second order information. Therefore, the electronic apparatus 100 may obtain a captured image including the external device 200 through S1706-2.

When the external device 200 is recognized based on a captured image in operation S1706-3-Y, the electronic apparatus 100 may inactivate the camera 110 in operation S1706-4. The electronic apparatus 100 may perform operations S1107 to S1155 of FIG. 11.

When the first order information is received from the external device 200, the electronic apparatus 100 may activate the camera 110. In addition, the electronic apparatus 100 may obtain a plurality of captured images including the external device 200 in operation S1130.

The captured image obtained in operation S1706-2 may be recited as the first captured image, and the captured image obtained in operation S1130 may be recited as the second captured image.

When the external device 200 is not recognized based on the captured image in operation S1706-3-N, the electronic apparatus 100 may determine whether the number of re-capturing is greater than or equal to threshold number of times in operation S1706-5.

If the number of times of capturing is less than the threshold number of times in operation S1706-5-N, the electronic apparatus 100 may display a UI for guiding the re-capturing in operation S1706-6. In addition, the electronic apparatus 100 may repeat operations S1706-2 to S1706-5.

When the number of capturing is greater than or equal to a threshold number in operation S1706-5-Y, the electronic apparatus 100 may determine that the external device 200 is not recognized in operation S1706-7.

Figure 18:
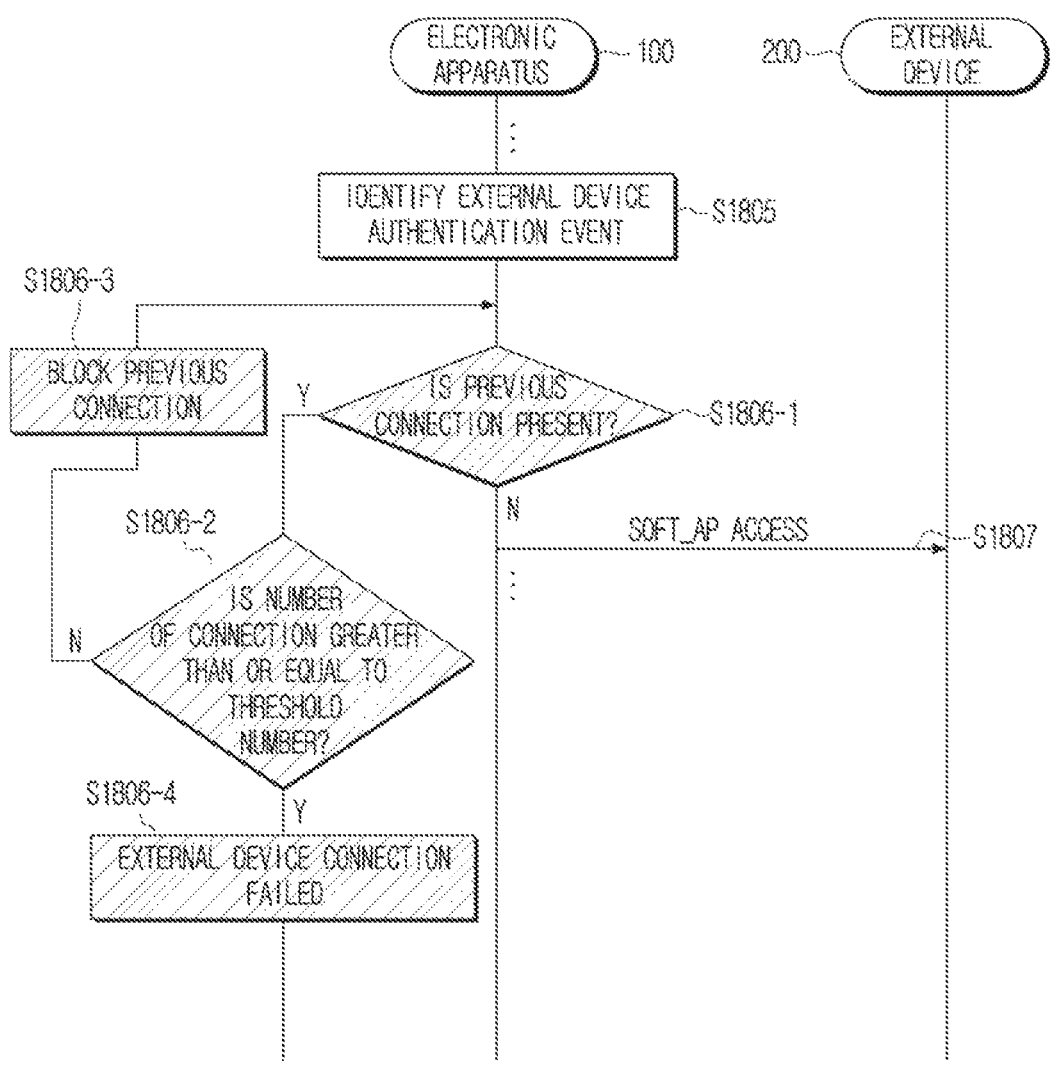
FIG. 18 is a flowchart illustrating an operation of determining whether an existing connection exists before capturing an external device according to one or more embodiments of the disclosure.

FIG. 18 is a flowchart illustrating an operation of determining whether an existing connection exists before capturing an external device 200 according to an embodiment of the disclosure.

In the embodiment of FIG. 18, operations S1101 to S1155 of FIG. 11 may be applied. The operations S1805, S1807 may correspond to operations S1105, S1107 of FIG. 11. Thus, a duplicate description will be omitted.

When an authentication event of the external device 200 is identified, the electronic apparatus 100 may determine whether an existing connection exists with another device in the electronic apparatus 100 in operation S1806-1.

If previous connection with another device is not present in operation S1806-1-N, the electronic apparatus 100 may perform operations of S1107 to S1155 of FIG. 11.

When there is previous connection with another device in operation S1806-1-Y, the electronic apparatus 100 may determine whether the number of connections are greater than or equal to the threshold numbers in operation S1806-2.

If the number of connections is not greater than or equal to the threshold number of times in operation S1806-2-N, the electronic apparatus 100 may block the existing connection in operation S1806-3. In addition, the electronic apparatus 100 may repeat operations S1806-1 to S1806-2.

If the number of connections is equal to or greater than a threshold number of times in operation S1806-2-Y, the electronic apparatus 100 may determine that the connection with the external device 200 has failed in operation S1806-4.

Figure 19:
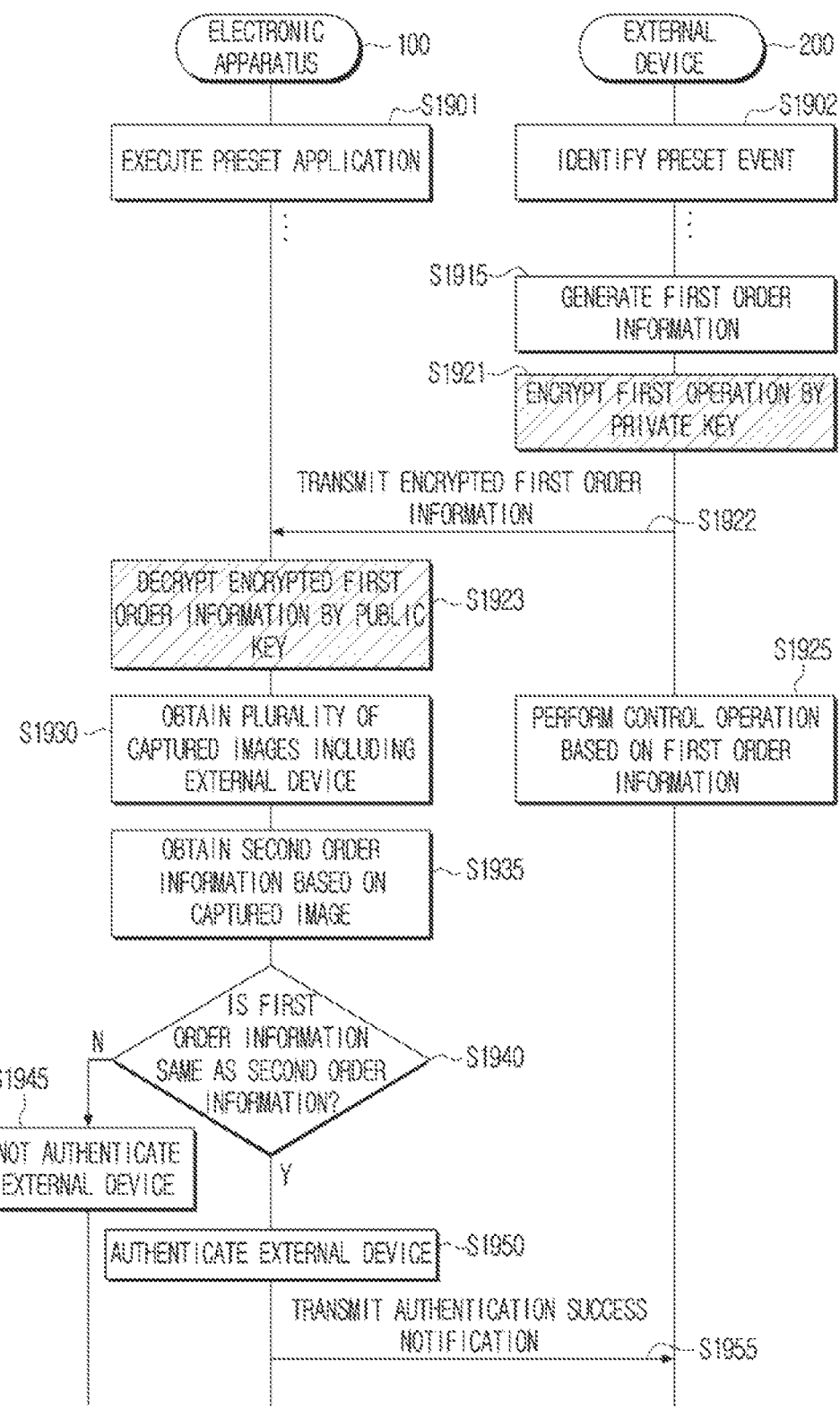
FIG. 19 is a flowchart illustrating an encryption operation and a decryption operation of order information according to one or more embodiments of the disclosure.

FIG. 19 is a flowchart illustrating an encryption operation and a decryption operation of order information according to an embodiment of the disclosure.

In the embodiment of FIG. 19, operations S1101 to S1155 of FIG. 11 may be applied. The operations S1901, S1902, S1915, S1925, S1930, S1935, S1940, S1945, S1950, S1955 may correspond to S1101, S1102, S1115, S1125, S1130, S1135, S1140, S1145, S1150, S1155 of FIG. 11. Thus, a duplicate description will be omitted.

After generating the first order information, the external device 200 may encrypt the first order information with a private key in operation S1921. The external device 200 may transmit the encrypted first order information to the electronic apparatus 100 in operation S1922.

The electronic apparatus 100 may receive encrypted first order information from the external device 200. When the encrypted first order information is received from the external device 200, the electronic apparatus 100 may decrypt the encrypted first order information with a public key in operation S1923.

The public key and the private key may be included in a preset symmetric key.

According to one or more embodiments, the external device 200 may prestore a private key, and the electronic apparatus 100 may prestore a public key corresponding to a private key.

According to one or more embodiments, the external device 200 may transmit, to the electronic apparatus 100, a certificate including a public key in the electronic apparatus 100 prior to operation S1922. The electronic apparatus 100 and the external device 200 may perform an operation related to transport layer (TLS), and the public key transmission operation may be included in an operation related to the TLS.

FIG. 20 is a diagram illustrating a structure of order information according to one or more embodiments of the disclosure.

A table 2010 of FIG. 20 represents an operation code performed in the external device 200. Each of the operations that may be performed in the external device 200 may be performed by a unique operation code. Referring to the table 2010, a start operation and an end operation may be separately determined during an operation performed in the external device 200. A start operation and an end operation may be predetermined so that the start and end of an operation performed in the external couple device 200 may be clearly identified.

For example, the operation code related to the refrigerator start operation may be "REF Action #S". In addition, the operation code related to the refrigerator end operation may be "REF Action #E".

The external device 200 may generate first order information for sequentially performing at least one operation among a plurality of operations which may be performed in the external device 200.

According to embodiment 2020, the external device 200 may not separately include a start operation and an end operation in the first order information. The external device 200 may generate first order information for sequentially performing operations A, B, C, and D. In an embodiment 2040, the electronic apparatus 100 may set a preset time interval at the start and end of an operation to easily determine the order of A, B, C, and D operations. The external device 200 may set a first time interval at the start and end of the operation and set a second time interval smaller than the first time interval between operations.

For example, the external device 200 may generate first order information for performing a 3 second standby, performing A operation, a 1 second standby, performing B operation, a 1 second standby, performing C operation, a 1 second standby, performing D operation, and a 3 second standby.

According to one or more embodiments 2030, the external device 200 may generate first order information by adding a start operation to a front part of a randomly generated operation order and adding an end operation to a rear part of the randomly generated operation order. The first order information may include a start operation, randomly generated operations, and an end operation in order.

For example, the external device 200 may generate first order information sequentially performing S, A, B, C, D, and E operations.

According to one or more embodiments, the electronic apparatus 100 may store a table corresponding to the first order information. The electronic apparatus 100 may store an operation table corresponding to the first order information in a buffer. The buffer may mean a temporary storage space included in the memory 160. The electronic apparatus 100 may identify operations included in the second order information. In addition, the electronic apparatus 100 may compare operations obtained in the second order information with the operations stored in the operation table. The electronic apparatus 100 may add, to the operation table, result information obtained by comparing operations stored in the operation table and operations obtained from the second order information. It is assumed that the new captured image is obtained and the third order information is obtained from the new captured image. The electronic apparatus 100 may add, to an operation table, result information obtained by comparing operations stored in the operation table and operations obtained from the third order information. The electronic apparatus 100 may update the operation table stored in the buffer. When the mismatch ratio is equal to or greater than the threshold ratio based on the comparison result updated in the operation table, the electronic apparatus 100 may determine that the authentication of the external device 200 has failed. In addition, the electronic apparatus 100 may delete the operation table from the buffer.

Figure 21:
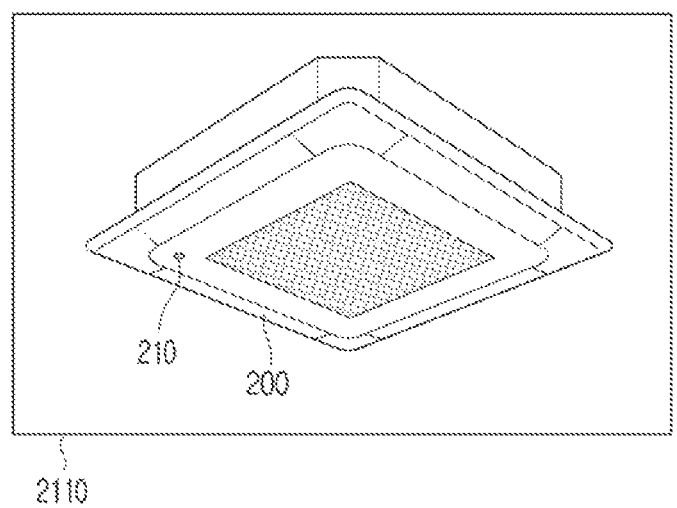
FIG. 21 is a diagram illustrating an operation of an external device analyzed based on a captured image according to one or more embodiments of the disclosure.

FIG. 21 is a diagram illustrating an operation of an external device 200 analyzed based on a captured image according to an embodiment of the disclosure.

Referring to embodiment 2110 of FIG. 21, the external device 200 may be a system air-conditioner. The system air-conditioner may include the display 210. The electronic apparatus 100 may obtain a captured image including an operation of the system air-conditioner.

The electronic apparatus 100 may identify an operation that a fan of a system air-conditioner is moving based on the captured image.

In addition, the electronic apparatus 100 may identify an image (or information) displayed on the display 210 of the system air-conditioner based on the captured image. The display 210 may mean a light emitting diode (LED).

In addition, the external device 200 may distinguish a control operation differently by adjusting the number of flickering, the flickering time interval, the flickering pattern, or the like, through the display 210.

The table 2020 includes various images (or image) that may be displayed on the display 210.

While the external device 200 is performing a function to output a first function (e.g., horizontal wind), the external device 200 may display an image of a first image (or first type).

The external device 200 may display an image of a second image (or a second type) on the display while the external device 200 performs a function of outputting a second function (for example, medium wind).

While the external device 200 performs a function of outputting a third function (for example, vertical wind), the external device 200 may display an image of a third image (or a third type) on the display.

While the external device 200 performs a function of outputting a fourth function (for example, automatic wind), the external device 200 may display a fourth image (or a fourth type) on the display. The fourth image may refer to an image in which the first to third images are consecutively configured. The fourth image may be an image in which consecutive order concepts are reflected. For example, the fourth image may refer to an image group in which a power-off image, a third image, a second image, and a first image are consecutively displayed.

According to one or more embodiments, when the external device 200 is implemented as a system air conditioner, the external device 200 may include at least one of a wing in a first direction, a wing in a second direction, a wing in a third direction, and a wing in a fourth direction. The external device 200 may distinguish an operation into a wing opening operation and a wing closing operation. In addition, the external device 200 may distinguish an operation based on an opening angle with respect to each wing.

In the meantime, according to one or more embodiments, when the external device 200 is implemented as a system air conditioner, the external device 200 may perform a grill lifter mode. The grill lifter mode may mean a mode in which a grill included in the external device 200 is descending or ascending. Therefore, the external device 200 may distinguish an operation through descending or ascending of the grill.

The external device 200 may distinguish an operation based on an image displayed on a display 210, the number of flickering times, a time interval of flickering, a flickering pattern, whether a wing is opened, a wing opening angle, whether a grill rises, or the like. The external device 200 may generate first order information by randomly selecting some operations among the divided operations.

According to one or more embodiments, when the external device 200 is implemented as a refrigerator, a washing machine, or a dryer, the external device 200 may include a display. The display may be implemented with a liquid crystal display (LCD) panel. The external device 200 may display a specific word or a specific number on a display. The external device 200 may generate first order information by randomly generating a specific word or a specific number.

According to one or more embodiments, when the external device 200 is implemented as a refrigerator, a washing machine, or a dryer without an LCD panel, the external device 200 may include a display including an LED. The external device 200 may distinguish an operation based on various images (or information) displayed on the LED. For example, the information displayed on the LED may be course information, time information, error code information, and the like. Therefore, the external device 200 may distinguish an operation based on information displayed on the LED. The external device 200 may generate first order information by randomly selecting some operations among the divided operations.

Figure 22:
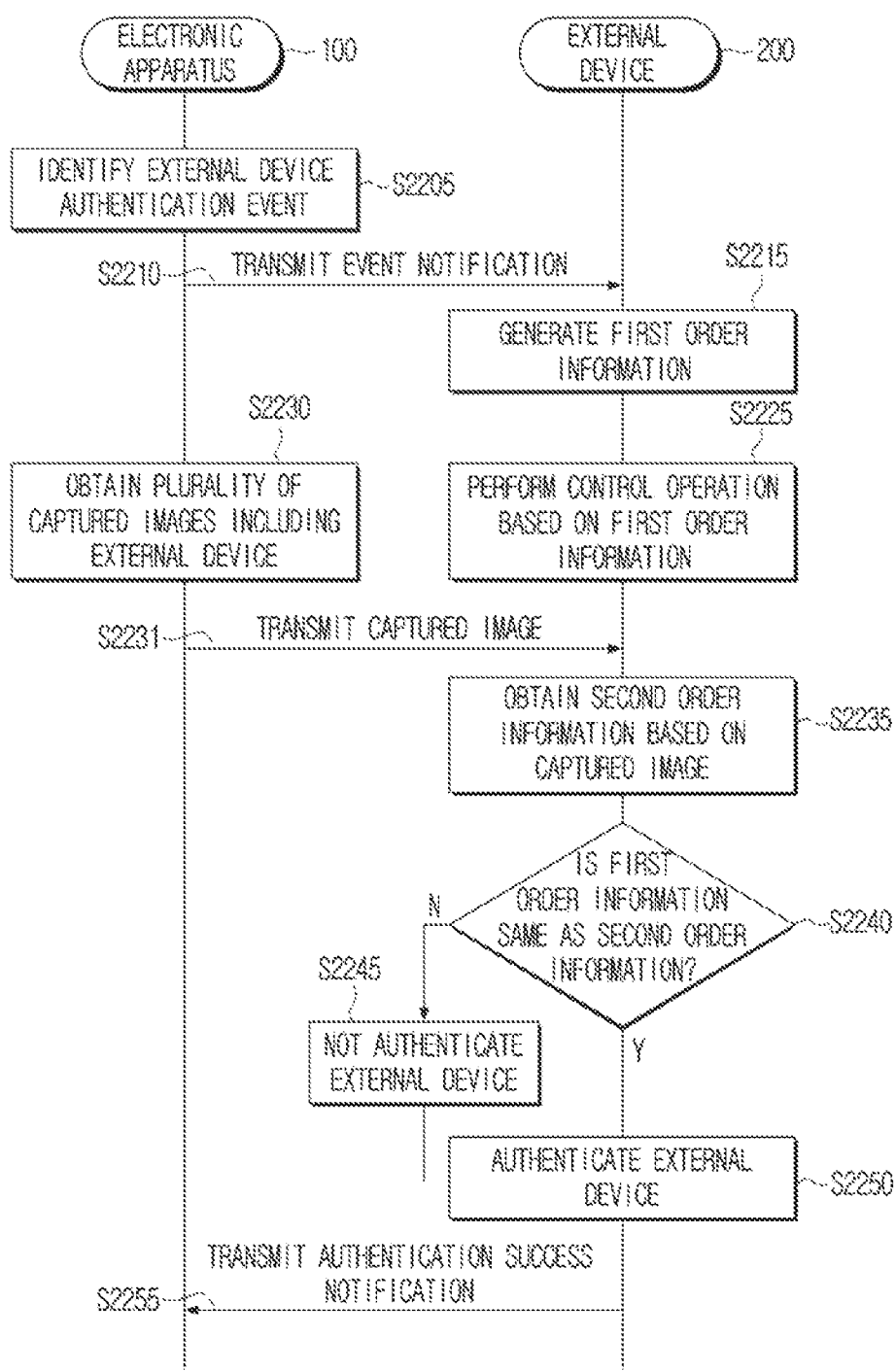
FIG. 22 is a flowchart illustrating an embodiment in which an order information comparison operation is performed in an external device.

FIG. 22 is a flowchart illustrating an embodiment in which an order information comparison operation is performed in an external device 200.

The operations S2205, S2210, S2215, S2225, S2230, S2235, S2240, S2245, S2250, S2255 of FIG. 22 may correspond to S405, S410, S415, S425, S430, S435, S440, S445, S450, S455 of FIG. 4. Therefore, a duplicate description will be omitted.

In the meantime, S2235 to S2255 may be performed by the external device 200 instead of the electronic apparatus 100.

After obtaining the captured image, the electronic apparatus 100 may transmit a captured image to the external device 200 in operation S2231. The external device 200 may receive a captured image from the electronic apparatus 100. In addition, the external device 200 may perform operations S2235 to S2255. With only a difference of operating subject, the operations S2235 to S2255 may correspond to operations S435 to S455 of FIG. 4.

Figure 23:
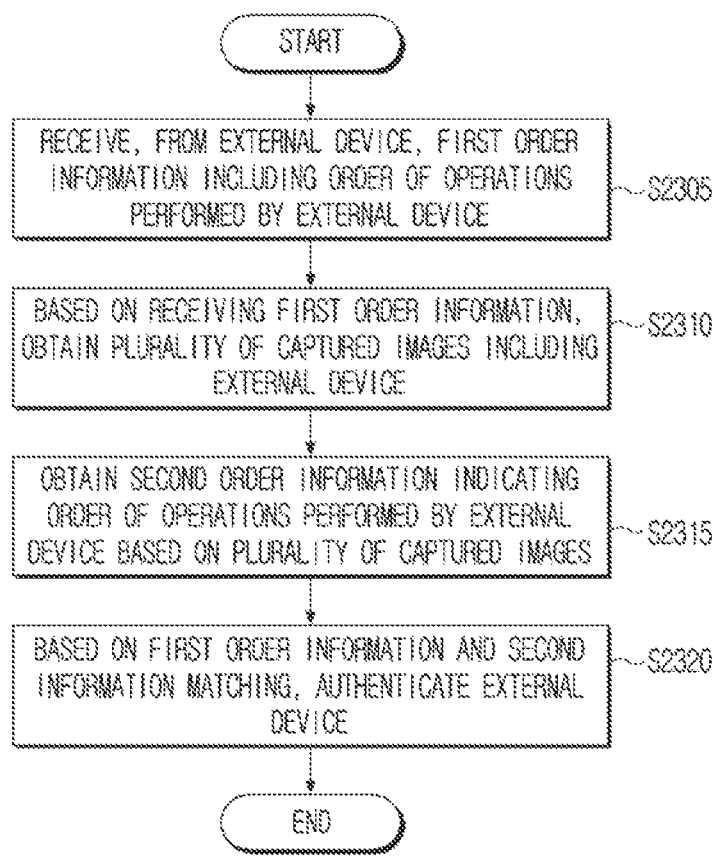
FIG. 23 is a diagram illustrating a method for controlling an electronic apparatus according to one or more embodiments of the disclosure.

FIG. 23 is a diagram illustrating a method for controlling an electronic apparatus 100 according to one or more embodiments.

Referring to FIG. 23, a method of controlling an electronic apparatus communicating with an external device includes receiving, from the external device, first order information including an order of operations performed by the external device in operation S2305, based on receiving the first order information, obtaining a plurality of captured images including the external device in operation S2310, obtaining second order information indicating an order of operations performed by the external device based on the plurality of captured images in operation S2315, and based on the first order information matching the second order information, authenticating the external device in operation S2320.

The control method may further include, based on an event related to connection with the external device being identified, transmitting an event notification to the external device, the first order information may be information generated in the external device based on the reception of the event notification, and the event related to connection with the external device may be an event for receiving a beacon signal broadcasted from the external device.

The first order information may include information related to an order in which a plurality of randomly selected operations are performed among a plurality of operations performed by the external device.

The first order information may include a preset start operation, a plurality of the randomly selected operations, and a preset end operation.

Based on the first order information matching the second order information, the control method may further include transmitting an authentication success notification to the external device and connecting to the external device.

The plurality of captured images may be first captured images, the control method may further include, based on the first order information and the second order information not matching, identifying a first operation not matching with the second order information among the first order information, transmitting a control command to perform the first operation to an external device through the communication interface, based on the control command being transmitted to the external device, obtaining a second captured image comprising the external device through the camera, and based on identifying that the external device performs the first operation based on the second captured image, authenticating the external device.

The plurality of captured images may be first captured images, and the control method may include, based on the first order information and the second order information not matching, obtaining a second captured image including the external device through the camera, obtaining third order information indicating an order of operations performed by the external device based on the second captured image, obtaining fourth order information by combining the second order information and the third order information, and based on the first order information and the fourth order information matching, authenticating the external device.

The control method may further include, based on receiving the first order information, displaying a screen to capture the external device.

The control method may further include, based on the first order information and the second order information not matching, displaying a screen to re-capture the external device.

The first order information may include time information of performing a plurality of operations included in the first order information, and the method may further include determining whether the camera is activated based on the time information included in the first order information.

The control method of the electronic apparatus 100 as shown in FIG. 23 may be executed on the electronic apparatus 100 having the configuration of FIG. 2 or FIG. 3, and may also be executed on the electronic apparatus 100 having other configurations.

The methods according to one or more embodiments may be implemented as a format of software or application installable to a related art electronic apparatus.

The methods according to one or more embodiments may be implemented by software upgrade of a related art electronic apparatus, or hardware upgrade only.

Also, one or more embodiments of the disclosure described above may be performed through an embedded server provided in an electronic apparatus, or through an external server of at least one of an electronic apparatus and a display device.

One or more embodiments of the disclosure may be implemented in software, including instructions stored on machine-readable storage media readable by a machine (e.g., a computer). An apparatus may call instructions from the storage medium, and execute the called instruction, including an image processing apparatus (for example, image processing apparatus A) according to the disclosed embodiments. When the instructions are executed by a processor, the processor may perform a function corresponding to the instructions directly or using other components under the control of the processor. The instructions may include a code generated by a compiler or a code executable by an interpreter. A machine-readable storage medium may be provided in the form of a non-transitory storage medium. Herein, the "non-transitory" storage medium may not include a signal but is tangible, and does not distinguish the case in which a data is semi-permanently stored in a storage medium from the case in which a data is temporarily stored in a storage medium.

According to an embodiment, the method according to the above-described embodiments may be included in a computer program product. The computer program product may be traded as a product between a seller and a consumer. The computer program product may be distributed online in the form of machine-readable storage media (e.g., compact disc read only memory (CD-ROM)) or through an application store (e.g., Play Store™) or distributed online directly. In the case of online distribution, at least a portion of the computer program product may be at least temporarily stored or temporarily generated in a server of the manufacturer, a server of the application store, or a machine-readable storage medium such as memory of a relay server.

According to one or more embodiments, the respective elements (e.g., module or program) of the elements mentioned above may include a single entity or a plurality of entities. According to the embodiments, at least one element or operation from among the corresponding elements mentioned above may be omitted, or at least one other element or operation may be added. Alternatively or additionally, a plurality of components (e.g., module or program) may be combined to form a single entity. In this case, the integrated entity may perform functions of at least one function of an element of each of the plurality of elements in the same manner as or in a similar manner to that performed by the corresponding element from among the plurality of elements before integration. The module, a program module, or operations executed by other elements according to variety of embodiments may be executed consecutively, in parallel, repeatedly, or heuristically, or at least some operations may be executed according to a different order, may be omitted, or the other operation may be added thereto.

While various embodiments have been illustrated and described with reference to various embodiments, the disclosure is not limited to specific embodiments or the drawings, and it will be understood by those of ordinary skill in the art that various changes in form and details may be made therein without departing from the spirit and scope of the disclosure, including the appended claims and their equivalents.

What is claimed is:

1. An electronic apparatus comprising:
a camera;
a communication interface configured to communicate with an external device; and
at least one processor configured to:
receive, through the communication interface from the external device, first order information comprising an order of operations performed by the external device,
based on receiving the first order information, obtain a plurality of captured images comprising the external device through the camera,
obtain second order information indicating an order of operations performed by the external device based on the plurality of captured images, and
based on the first order information matching the second order information, authenticate the external device.

2. The electronic apparatus of claim 1, wherein the at least one processor is further configured to, based on identifying an event related to connection with the external device, transmit an event notification to the external device through the communication interface,
wherein the first order information is generated in the external device based on the reception of the event notification, and
wherein the event related to connection with the external device comprises reception of a beacon signal broadcasted from the external device.

3. The electronic apparatus of claim 1, wherein the first order information further comprises information related to an order in which a plurality of randomly selected operations are performed by the external device.

4. The electronic apparatus of claim 3, wherein the first order information further comprises a preset start operation, a plurality of the randomly selected operations, and a preset end operation.

5. The electronic apparatus of claim 1, wherein the at least one processor is further configured to:
based on the first order information matching the second order information, transmit an authentication success notification to the external device through the communication interface, and
control the communication interface to communicably connect to the external device.

6. The electronic apparatus of claim 1, wherein the plurality of captured images are first captured images, and
wherein the at least one processor is further configured to:
based on the first order information and the second order information not matching, identify a first operation among the first order information that does not match the second order information,
transmit, through the communication interface, a control command to cause the external device to perform the first operation, based on the control command being transmitted to the external device, obtain a second captured image comprising the external device through the camera, and based on identifying that the external device performs the first operation based on the second captured image, authenticate the external device.

7. The electronic apparatus of claim 1, wherein the plurality of captured images are first captured images, and wherein the at least one processor is further configured to:
based on the first order information and the second order information not matching, obtain a second captured image comprising the external device through the camera,
obtain third order information indicating an order of operations performed by the external device based on the second captured image,
obtain fourth order information by combining the second order information and the third order information, and
based on the first order information and the fourth order information matching, authenticate the external device.

8. The electronic apparatus of claim 1, further comprising a display,
wherein the at least one processor is further configured to, based on receiving the first order information through the communication interface, control the display to display a screen regarding capture of the plurality of captured images.

9. The electronic apparatus of claim 1, further comprising a display,
wherein the at least one processor is further configured to, based on the first order information and the second order information not matching, control the display to display a screen regarding re-capture of a plurality of images of the external device.

10. The electronic apparatus of claim 1, wherein the first order information further comprises time information related to the performance of a plurality of operations included in the first order information, and
wherein the at least one processor is further configured to identify whether the camera is activated based on the time information.

11. A method of controlling an electronic apparatus configured to communicate with an external device, the method comprising:
receiving, from the external device, first order information comprising an order of operations performed by the external device;
based on receiving the first order information, obtaining a plurality of captured images comprising the external device;
obtaining second order information indicating an order of operations performed by the external device based on the plurality of captured images; and
based on the first order information matching the second order information, authenticating the external device.

12. The method of claim 11, further comprising:
based on identifying an event related to connection with the external device, transmitting an event notification to the external device,
wherein the first order information is generated in the external device based on the reception of the event notification, and wherein the event related to connection with the external device comprises reception of a beacon signal broadcasted from the external device.

13. The method of claim 11, wherein the first order information further comprises information related to an order in which a plurality of randomly selected operations are performed by the external device.

14. The method of claim 13, wherein the first order information further comprises a preset start operation, a plurality of the randomly selected operations, and a preset end operation.

15. The method of claim 11, further comprising:
based on the first order information matching the second order information, transmitting an authentication success notification to the external device; and
connecting to the external device.

16. The method of claim 11, further comprising:
based on the first order information and the second order information not matching, identifying a first operation among the first order information that does not match the second order information;
transmitting a control command to cause the external device to perform the first operation;
based on the control command being transmitted to the external device, obtaining one or more second captured images comprising the external device; and
based on identifying that the external device performs the first operation based on the one or more second captured images, authenticating the external device.

17. The method of claim 11, further comprising:
based on the first order information and the second order information not matching, obtaining a second captured image comprising the external device,
obtaining third order information indicating an order of operations performed by the external device based on the second captured image,
obtaining fourth order information by combining the second order information and the third order information, and
based on the first order information and the fourth order information matching, authenticating the external device.

18. A non-transitory computer readable medium having instructions stored therein, which when executed by at least one processor cause the at least one processor to execute a method of controlling an electronic apparatus, the method comprising:
receiving, from an external device, first order information comprising an order of operations performed by the external device;
based on receiving the first order information, obtaining a plurality of captured images comprising the external device;
obtaining second order information indicating an order of operations performed by the external device based on the plurality of captured images; and
based on the first order information matching the second order information, authenticating the external device.

19. The non-transitory computer readable medium of claim 18, wherein the method further comprises:
based on identifying an event related to connection with the external device, transmitting an event notification to the external device,
wherein the first order information further comprises information generated in the external device based on the reception of the event notification, and wherein the event related to connection with the external device comprises reception of a beacon signal broadcasted from the external device.

20. The non-transitory computer readable medium of claim 18, wherein the method further comprises:
based on the first order information and the second order information not matching, obtaining a second captured image comprising the external device;
obtaining third order information indicating an order of operations performed by the external device based on the second captured image;
obtaining fourth order information by combining the second order information and the third order information, and
based on the first order information and the fourth order information matching, authenticating the external device.

* * * * *